United States Patent
Gou et al.

(10) Patent No.: US 11,398,884 B2
(45) Date of Patent: Jul. 26, 2022

(54) INFORMATION DECODING METHOD AND APPARATUS, CODEBOOK PROCESSING METHOD AND APPARATUS, STORAGE MEDIUM, AND PROCESSOR

(71) Applicant: ZTE CORPORATION, Guangdong (CN)

(72) Inventors: Wei Gou, Guangdong (CN); Peng Hao, Guangdong (CN); Xing Liu, Guangdong (CN); Zhisong Zuo, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 186 days.

(21) Appl. No.: 16/768,184

(22) PCT Filed: Nov. 9, 2018

(86) PCT No.: PCT/CN2018/114918
§ 371 (c)(1),
(2) Date: May 29, 2020

(87) PCT Pub. No.: WO2019/105205
PCT Pub. Date: Jun. 6, 2019

(65) Prior Publication Data
US 2020/0295886 A1 Sep. 17, 2020

(30) Foreign Application Priority Data
Nov. 29, 2017 (CN) .......................... 201711230885.4

(51) Int. Cl.
*H04L 1/18* (2006.01)
*H04L 5/00* (2006.01)

(52) U.S. Cl.
CPC .......... *H04L 1/1864* (2013.01); *H04L 1/1812* (2013.01); *H04L 1/1854* (2013.01);
(Continued)

(58) Field of Classification Search
CPC .. H04W 72/042; H04W 72/14; H04L 1/1607; H04L 1/1864; H04L 1/1812;
(Continued)

(56) References Cited

U.S. PATENT DOCUMENTS

| 2015/0236824 A1 | 8/2015 | Lei et al. |
| 2016/0192354 A1 | 6/2016 | Wei et al. |

(Continued)

FOREIGN PATENT DOCUMENTS

| CN | 101958777 A | 1/2011 |
| CN | 104662831 A | 5/2015 |

(Continued)

OTHER PUBLICATIONS

European Search Report and Written Opinion for the European Patent Application No. EP18883890, dated Jul. 20, 2021, 7 pages.
(Continued)

*Primary Examiner* — Vinncelas Louis
(74) *Attorney, Agent, or Firm* — KDB Firm PLLC

(57) ABSTRACT

Provided are an information decoding method and apparatus, a codebook processing method and apparatus, a storage medium, and a processor. The information decoding method includes: determining a codebook used by HARQ-ACKs of multiple PDSCHs or TBs fed back by a terminal in at least one of following manners: manner one: determining based on a first reference carrier in multiple carriers configured for the terminal; or manner two: determining based on DAI information sent to the terminal; and decoding the codebook.

17 Claims, 8 Drawing Sheets

Determine a codebook multiplexed by HARQ-ACKs of multiple PDSCHs or TBs fed back by a terminal in at least one of following manners: manner one: determining based on a first reference carrier in multiple carriers configured for the terminal; or manner two: determining based on DAI information sent to the terminal — S202

Decode the codebook — S204

(52) U.S. Cl.
CPC .......... *H04L 1/1887* (2013.01); *H04L 1/1896* (2013.01); *H04L 5/001* (2013.01); *H04L 5/0055* (2013.01)

(58) Field of Classification Search
CPC ... H04L 1/1854; H04L 1/1887; H04L 1/1896; H04L 5/001; H04L 5/0055; H04L 1/1861
See application file for complete search history.

(56) References Cited

U.S. PATENT DOCUMENTS

| | | | |
|---|---|---|---|
| 2017/0041123 A1 | 2/2017 | Yang et al. | |
| 2017/0134140 A1* | 5/2017 | Park | H04L 1/1607 |
| 2019/0150122 A1* | 5/2019 | Ying | H04W 72/14 370/329 |
| 2020/0374044 A1* | 11/2020 | Lei | H04W 72/042 |

FOREIGN PATENT DOCUMENTS

| | | |
|---|---|---|
| CN | 106549734 A | 3/2017 |
| WO | 2017049463 A1 | 3/2017 |

OTHER PUBLICATIONS

Samsung, "HARQ-ACK codebook determination for eCA" 3GPP TSG RAN WG1 Meeting #82bis, Malmö, Sweden, Oct. 5-9, 2015—R1-155449, 12 pages.
Fujitsu, "Discussion on HARQ-ACK codebook and HARQ feedback timing" 3GPP TSG RAN WG1 Meeting #91, Reno, USA, Nov. 27-Dec. 1, 2017—R1-1719614, 5 pages.
Search Report for the Chinese Patent Application No. 2017112308854, dated Mar. 12, 2021, 2 pages.
Office Action for the Chinese Parent Application No. 2017112308854, dated Mar. 12, 2021, 6 pages.
3GPP. "Status Report to TSG." 3GPP TSG RAN Meeting #76 RP-1711505., Jun. 8, 2017.
International Search Report for the International Patent Application PCT/CN2018/114918, dated Jan. 31, 2019, 2 pages.

* cited by examiner

INFORMATION DECODING METHOD AND APPARATUS, CODEBOOK PROCESSING METHOD AND APPARATUS, STORAGE MEDIUM, AND PROCESSOR

CROSS-REFERENCE TO RELATED APPLICATIONS

This is a National Stage Application, filed under 35 U.S.C. 371, of International Patent Application No. PCT/CN2018/114918, filed on Nov. 9, 2018, which claims priority to Chinese patent application No. 201711230885.4 filed on Nov. 29, 2017, contents of both of which are incorporated herein by reference in their entireties.

TECHNICAL FIELD

The present disclosure relates to, but is not limited to, the field of communications, in particular, to an information decoding method and apparatus, a codebook processing method and apparatus, a storage medium, and a processor.

BACKGROUND

In New Radio (NR), different subcarrier spacings (SCSs) are provided. For example, typical SCSs are 15 KHz, 30 KHz, 60 KHz and 120 KHz. These different SCSs will lead to different time duration of a scheduling unit. For example, if a scheduling unit includes 14 Orthogonal Frequency Division Multiplexing (OFDM) symbols, and a scheduling-unit length of a carrier (CC) with a subcarrier spacing of 15 KHz is N, a scheduling-unit length of a carrier with an SCS of 30 KHz is N/2, a scheduling-unit length of a carrier with an SCS of 60 KHz is N/4, and a scheduling-unit length of a carrier with an SCS of 120 KHz is N/8.

There is a working mode of a carrier aggregation in the NR. If carriers with different SCSs transmit data to one user equipment (UE) through the carrier aggregation, how does the UE feed back hybrid automatic repeat request acknowledgements (HARQ-ACKs) to data in these carriers with different SCSs. Especially, multiple physical downlink shared channels (PDSCHs) (or transport blocks (TBs), where the transport blocks are taken as an example hereinafter) are scheduled in these carriers with different SCSs, and these TBs are required to feed back HARQ-ACKs within a physical uplink control channel (PUCCH) group of a carrier (that is, the HARQ-ACKs of these TBs need to be multiplexed together for feedback), how does the UE feed back the HARQ-ACKs to the data in the carriers with these different SCSs.

However, when the SCSs of the aggregated carriers in the NR are different (or the scheduling-unit time durations of the aggregated carriers are different), if the HARQ-ACKs of the TBs in multiple aggregated CCs are required to be multiplexed together, it cannot be ensured efficiently that the codebook size is consistent between a base station and the UE.

In the related art, no effective scheme has yet been proposed.

SUMMARY

Embodiments of the present disclosure provide an information decoding method and apparatus, a codebook processing method and apparatus, a storage medium and a processor.

According to an embodiment of the present disclosure, an information decoding method is provided. The method includes following steps: a codebook used by HARQ-ACKs of multiple PDSCHs or TBs fed back by a terminal is determined in at least one of following manners: manner one: the codebook is determined based on a first reference carrier in multiple carriers configured for the terminal; or manner two: the codebook is determined based on downlink assignment index (DAI) information sent to the terminal; and the codebook is decoded.

According to an embodiment of the present disclosure, a codebook processing method is provided. The method includes following steps: a codebook used by HARQ-ACKs of multiple PDSCHs or TBs fed back by a terminal is determined in at least one of following manners: manner one: the codebook is determined based on a first reference carrier in multiple carriers configured by a base station for the terminal; or manner two: the codebook is determined based on DAI information received by the terminal; and the codebook is fed back.

According to an embodiment of the present disclosure, an information decoding apparatus is provided. The apparatus includes a determination module and a decoding module. The determination module is configured to determine a codebook used by HARQ-ACKs of multiple PDSCHs or TBs fed back by a terminal in at least one of following manners: manner one: determining based on a first reference carrier in multiple carriers configured for the terminal; or manner two: determining based on DAI information sent to the terminal. The decoding module is configured to decode the codebook.

According to an embodiment of the present disclosure, a codebook processing apparatus is provided. The apparatus includes a determination module and a processing module. The determination module is configured to determine a codebook used by HARQ-ACKs of multiple PDSCHs or TBs fed back by a terminal in at least one of following manners: manner one: determining based on a first reference carrier in multiple carriers configured by a base station for the terminal; or manner two: determining based on DAI information received by the terminal. The processing module is configured to feed back the codebook.

According to another embodiment of the present disclosure, a storage medium is further provided. The storage medium includes stored programs. The programs, when executed, perform the method of any one of the embodiments described above.

According to another embodiment of the present disclosure, a processor is further provided. The processor is configured to execute programs. The programs, when executed, perform the method of any one of the embodiments described above.

According to another embodiment of the present disclosure, an electronic device is further provided. The electronic device includes a memory, a processor and computer programs stored in the memory and executable on the processor, where the processor is configured to execute, through the computer programs, the method of any one of the embodiments described above.

According to the present disclosure, the codebook multiplexed by the HARQ-ACKs of the multiple PDSCHs or TBs fed back by the terminal is determined based on the first reference carrier configured for the terminal and/or the DAI information sent to the terminal, and the codebook is decoded, so that the codebook used by the base station and the codebook used by the terminal can be ensured to be consistent when the HARQ-ACKs of the multiple PDSCHs or TBs are multiplexed together. Therefore, a communication failure caused by the inconsistent codebook used between the base station and the UE in the related art can be avoided.

BRIEF DESCRIPTION OF DRAWINGS

The drawings described here are used for providing a further understanding of the present disclosure and form a part of the present disclosure. The exemplary embodiments and descriptions thereof in the present disclosure are used for explaining the present disclosure and not for limiting the present disclosure in any improper way. In the drawings.

DETAILED DESCRIPTION

The present disclosure will be described hereinafter in detail with reference to the drawings and in conjunction with embodiments. It should be noted that if not in collision, the embodiments and features thereof in the present disclosure can be combined with each other.

It should be noted that the terms "first", "second" and the like in the description, claims and drawings of the present disclosure are used for distinguishing between similar objects and are not necessarily used for describing a particular order or sequence.

Figure 1:
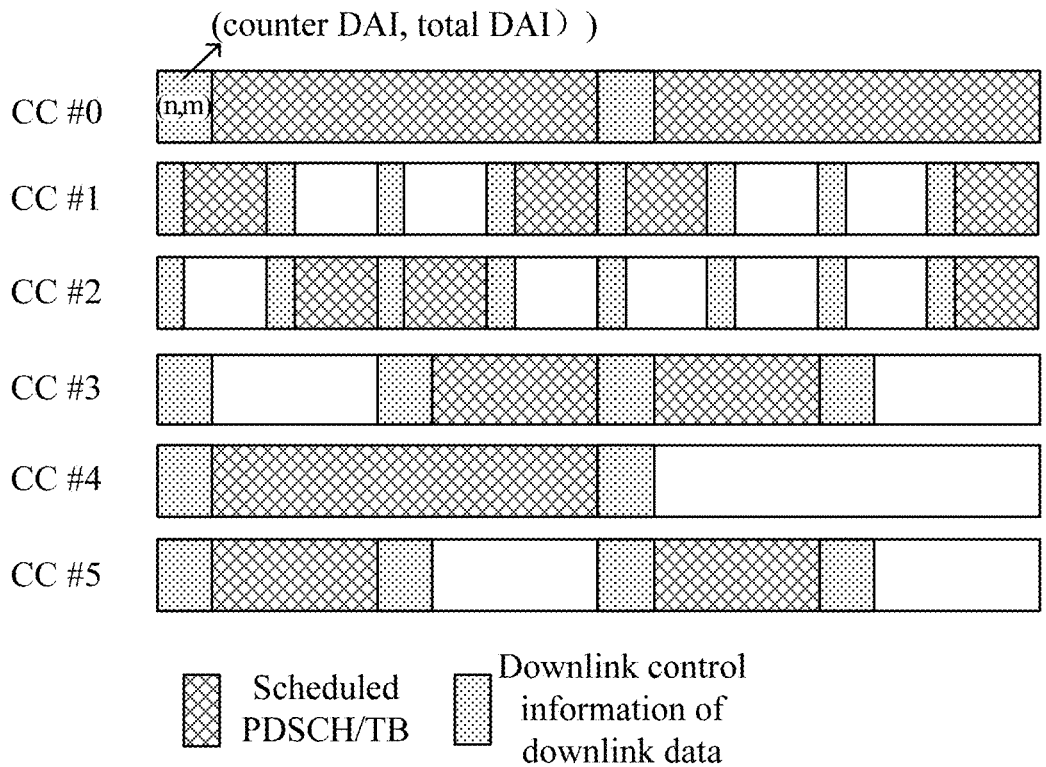
FIG. 1 is a schematic diagram illustrating carriers with different SCSs or different scheduling-unit time duration being aggregated to transmit data for one UE in the related art.

FIG. 1 is a schematic diagram illustrating carriers with different SCSs or different scheduling-unit time duration being aggregated to transmit data for one UE in the related art. In FIG. 1, a UE is configured with six carriers. An SCS of CC #0 and an SCS of CC #4 are 15 KHz, and the length of the scheduling units is the longest; an SCS of CC #3 and an SCS of CC #5 are 30 KHz, and the length of the scheduling units is medium; and an SCS of CC #1 and an SCS of CC #2 are 60 KHz, and the length of the scheduling units is the shortest.

According to the mode in the LTE, when the number of carriers configured for the UE is greater than or equal to 5, a DAI mechanism is used for helping the UE find a lost TB. This DAI mechanism is able to help the UE find the lost TB, so that when an HARQ-ACK is formed, a corresponding HARQ-ACK should also be formed for the lost TB. Thus the total number of bits (i.e., the number of bits of the fed back HARQ-ACKs, which is called a codebook size) corresponding to the HARQ-ACKs of the multiple TBs when multiplexed is consistent between the base station and the UE, so that the HARQ-ACKs of the multiple TBs are multiplexed smoothly.

A key to the DAI mechanism is that at the end of receiving the DAI, it is necessary to ensure that at least one piece of DAI information is received. If it is ensured, the DAI mechanism cannot reflect all TBs reliably. Therefore, in the LTE, the DAI is carried through DCI, and it is considered that the UE may correctly receive at least once when detecting 4 pieces of DCI information. But SCSs of all aggregated carriers are the same in the LTE.

However, when the SCSs of the aggregated carriers in the NR are different (or scheduling-unit time durations of the aggregated carriers are different), if the HARQ-ACKs of the TBs in multiple aggregated CCs are required to be multiplexed together, it should be efficiently ensured that the codebook size is consistent between the base station and the UE.

Figure 2:
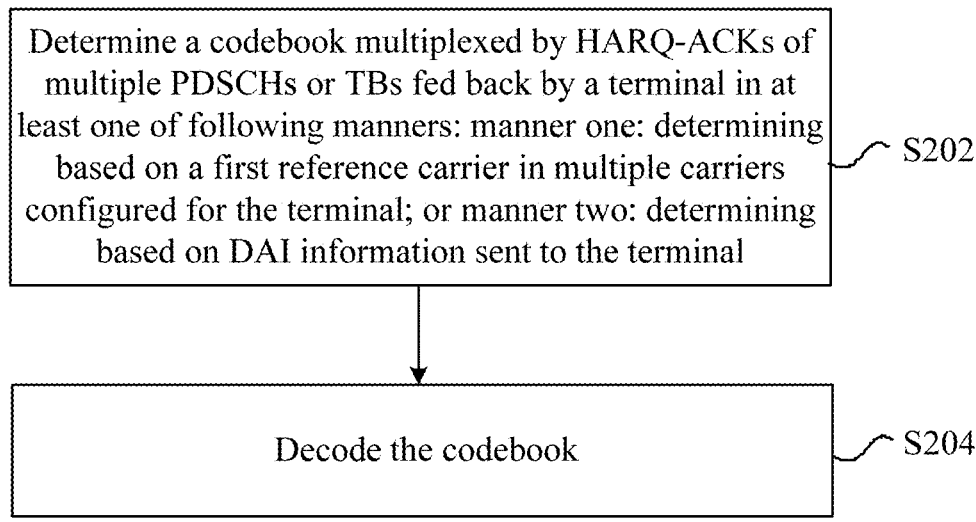
FIG. 2 is a flowchart of an information decoding method according to an embodiment of the present disclosure.

An embodiment of the present disclosure provides an information decoding method. FIG. 2 is a flowchart of an information decoding method according to an embodiment of the present disclosure. As shown in FIG. 2, the method includes steps described below.

In step S202, a codebook multiplexed by HARQ-ACKs of multiple PDSCHs or TBs fed back by a terminal is determined in at least one of following manners: manner one: the codebook is determined based on a first reference carrier in multiple carriers configured for the terminal; or manner two: the codebook is determined based on DAI information sent to the terminal.

In step S204, the codebook is decoded.

According to the above steps, the codebook multiplexed by the HARQ-ACKs of the multiple PDSCHs or TBs fed back by the terminal is determined based on the first reference carrier configured for the terminal and/or the DAI information sent to the terminal, and the codebook is decoded, so that the codebook used by the base station and the codebook used by the terminal can be ensured to be consistent when the HARQ-ACKs of the multiple PDSCHs or TBs are multiplexed together. Therefore, the communication failure caused by the inconsistent codebook can be reduced.

It should be noted that the above the consistency of the codebook may include that the consistency of the codebook size and a bit order in the codebook.

It should be noted that the above codebook may be a dynamic codebook or a fixed codebook, but it is not limited thereto.

It should be noted that, in the case where the above codebook is determined in the manner one, each scheduling unit group in part or all of the multiple carriers and aligned with a first specified scheduling unit in the first reference carrier uses a pre-agreed fixed codebook.

It should be noted that the above scheduling unit group includes multiple scheduling units in the part or all of the multiple carriers and aligned with the first specified scheduling unit. It should be noted that each scheduling unit group may correspond to an HARQ-ACK with multiple bits, or an entire scheduling unit group uses one bit, and an HARQ-ACK bundling mechanism may be used among multiple scheduling units in one scheduling unit group, but it is not limited thereto.

In this way, the scheduling units with the shorter time duration are grouped. The time durations of the scheduling units in each group are the same as that of the first specified scheduling unit in the first reference carrier and the codebook of the scheduling units in each group is fixed. Therefore, multiple carriers may be processed by being considered as multiple carriers with the same "scheduling-unit time duration".

It should be noted that the fixed codebook described in this embodiment may also be called a semi-static codebook, but it is not limited thereto.

It should be noted that the step in which the codebook is determined based on the manner one may be represented as followings steps: one or more scheduling unit groups included in the multiple carriers are determined according to the first reference carrier, a first codebook corresponding to the one or more scheduling unit groups according to the one or more scheduling unit groups, a second codebook is determined according to a scheduling unit in the first reference carrier and a scheduling unit in a carrier whose scheduling-unit time duration is the same as a scheduling-unit time duration of the first reference carrier, and the first codebook and the second codebook are determined as the codebook; or one or more scheduling unit groups included in the multiple carriers are determined according to the first reference carrier, and the codebook is determined according to a frequency-domain priority rule and according to scheduling units and the scheduling unit group in the multiple carriers.

It should be noted that a composition of the codebook includes at least one of the followings: in the case where the codebook is a dynamic codebook, and at least one scheduling unit in a scheduling unit group transmits the PDSCHs or TBs, a corresponding HARQ-ACK is composed according to a pre-agreed fixed codebook corresponding to the scheduling unit group, and in the case where no scheduling unit in the scheduling unit group transmits the PDSCHs or TBs, the scheduling unit group does not compose the corresponding HARQ-ACK; or in the case where the codebook is a fixed codebook, for each scheduling unit group, a corresponding HARQ-ACK is composed according to a pre-agreed fixed codebook corresponding to the each scheduling unit group.

It should be noted that an HARQ-ACK corresponding to the scheduling unit group may include at least one of: a TB-level HARQ-ACK formed for each PDSCH or TB according to the number of PDSCHs or TBs transmitted in the scheduling unit group; a code block group (CBG)-level HARQ-ACK formed for each PDSCH or TB according to the number of PDSCHs or TBs transmitted in the scheduling unit group; or a TB-level HARQ-ACK or a CBG-level HARQ-ACK fed back according to a fixed codebook bundled by PDSCHs or TBs transmitted in the scheduling unit group.

It should be noted that the first specified scheduling unit is the last scheduling unit in the first reference carrier within a time period from an occasion starting to schedule the multiple PDSCHs or TBs to an occasion stopping to schedule the multiple PDSCHs or TBs. In this way, the codebook overhead can be reduced and the flexibility can be improved.

It should be noted that the scheduling unit group includes at least one of: within a time period from an occasion starting to schedule the multiple PDSCHs or TBs to an occasion stopping to schedule the multiple PDSCHs or TBs, a scheduling unit group corresponding to the last scheduling unit in the first reference carrier; within a time period from an occasion starting to schedule the multiple PDSCHs or TBs to an occasion stopping to schedule the multiple PDSCHs or TBs, a scheduling unit group in the part or all of the multiple carriers and corresponding to a starting position of the last scheduling unit in the first reference carrier; or within a time period from an occasion starting to schedule the multiple PDSCHs or TBs to an occasion stopping to schedule the multiple PDSCHs or TBs, a scheduling unit group in which a PDSCH or a TB has been transmitted at a starting position of the last scheduling unit in the first reference carrier.

It should be noted that the first reference carrier is at least one of: a carrier with the minimum subcarrier spacing in the multiple carriers; a carrier with the longest scheduling-unit time duration in the multiple carriers; a reference carrier configured for the terminal; or a predetermined reference carrier.

In an embodiment of the present disclosure, before the above step S202, the above method may further include at least one of following steps: at a scheduling occasion of a scheduling unit in which the last PDSCH or TB of multiple scheduled PDSCHs or TBs is located or within a scheduling unit in which the last PDSCH or TB is located, the DAI information is sent to the terminal by using DCI in a mini-slot; or a predetermined amount of DCI carrying the DAI information is sent to the terminal at a public DCI listening occasion set for a carrier configured for the terminal.

It should be noted that the DCI in the mini-slot is allowed to not schedule user data. That is, the mini-slot may not carry the user data, that is, may send only the DCI carrying the DAI, thereby improving the reliability of the terminal receiving the DCI carrying DAI at the end of the scheduling.

It should be noted that the above method may be applied to at least one of following scenarios, but is not limited thereto: a single carrier is configured for the terminal; multiple carriers with different scheduling-unit time durations are configured for the terminal; multiple carriers with different subcarrier spacings are configured for the terminal; or multiple carriers with the same subcarrier spacing are configured for the terminal.

In some embodiments, the step in which the DAI information is sent to the terminal by using the DCI in the mini-slot may include following steps: the mini-slot is carried through the first specified carrier at a sending occasion of DCI corresponding to the last PDSCH or TB, where the mini-slot carries the DCI of the DAI information, and the first specified carrier is different from a carrier carrying the last PDSCH or TB.

It should to be noted that the sum of the number of first specified carriers and the number of second specified carriers is greater than or equal to a required number. In the case where the required number is the minimum number of DCI sending times required by the terminal to correctly detect the DCI once, the second specified carriers are carriers whose scheduling-unit time duration is the same as a time duration of a scheduling unit in which the last PDSCH or TB is located.

It should to be noted that the amount of sent DCI is greater than or equal to a required amount, where the required amount is the minimum number of DCI sending times required by the terminal to correctly detect the DCI once.

Through configuring the required amount described above, it can be ensured that the terminal may correctly detect the DCI, thereby the reliability of receiving the DCI carrying the DAI is ensured.

In an embodiment of the present disclosure, the public DCI listening occasion is a position aligned with a DCI sending occasion of a second specified scheduling unit in a second reference carrier and in part or all of the multiple carriers configured for the terminal. The reliability of receiving the DCI carrying the DAI may be ensured through configuring the public DCI listening occasion. It should be noted that the second reference carrier and the first reference carrier may be the same carrier.

It should be noted that the second reference carrier may be determined in at least one of following manners: a carrier with the minimum subcarrier spacing in the part or all of the multiple carriers is determined as the second reference carrier; a carrier with the longest scheduling-unit time duration in the part or all of the multiple carriers is determined as the second reference carrier; in the case where the number of carriers with a first subcarrier spacing in the part or all of the multiple carriers is greater than or equal to a predetermined threshold value, the second reference carrier is located in the carriers with the first subcarrier spacing; in the case where the number of carriers with the first subcarrier spacing in the part or all of the multiple carriers is less than the predetermined threshold value, and the sum of the number of carriers with a second subcarrier spacing and the number of carriers with the first subcarrier spacing in the part or all of the multiple carriers is greater than or equal to the predetermined threshold value, the second reference carrier is located in the carriers with the second subcarrier spacing; a reference carrier configured for the terminal is determined as the second reference carrier; or a pre-agreed reference carrier is determined as the second reference carrier.

It should be noted that the above first subcarrier spacing is greater than or equal to the second subcarrier spacing, but it is not limited thereto.

It should be noted that the second specified scheduling unit is the last scheduling unit in the second reference carrier within a time period from an occasion starting to schedule the multiple PDSCHs or TBs to an occasion stopping to schedule the multiple PDSCHs or TBs.

It should be noted that the number of all of the multiple carriers is greater than or equal to a predetermined value.

It should be noted that the above steps may, but may not necessarily, be executed by a base station.

Figure 3:
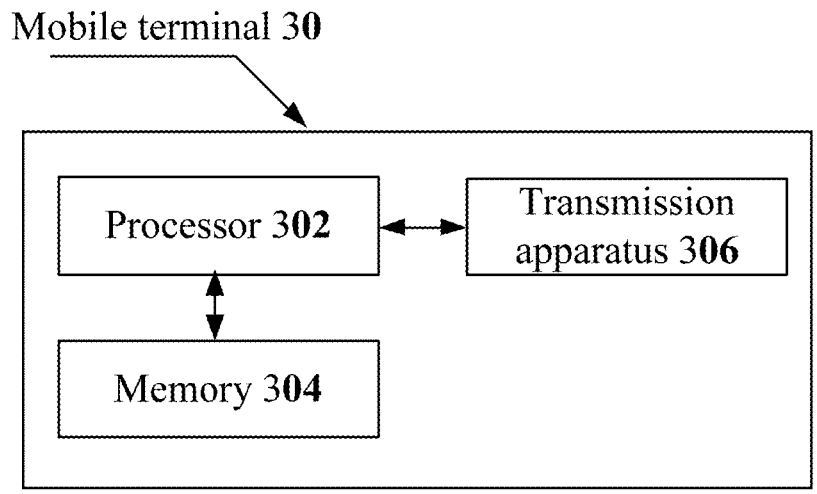
FIG. 3 is a structural block diagram of hardware of a mobile terminal for a codebook processing method according to an embodiment of the present disclosure.

An embodiment of the present disclosure further provides a method embodiment of a codebook processing method. The method embodiment may be executed in a mobile terminal, a computer terminal or other similar computing apparatuses. Taking the method to be executed in the mobile terminal as an example, FIG. 3 is a structural block diagram of hardware of a mobile terminal for a codebook processing method according to an embodiment of the present disclosure. As shown in FIG. 3, a mobile terminal 30 may include one or more (only one is shown in FIG. 3) processors 302 (the processor 302 may include, but is not limited to, a microprocessor such as a microcontroller unit (MCU), a programmable logic device such as a field-programmable gate array (FPGA), or other processing devices), a memory 304 used for storing data, and a transmission device 306 used for a communication function. It should be understood by those skilled in the art that the structure shown in FIG. 3 is merely illustrative and not intended to limit the structure of the electronic device described above. For example, the mobile terminal 30 may further include more or fewer components than the components shown in FIG. 3, or may have a configuration different from the configuration shown in FIG. 3.

The memory 304 may be is configured to store software programs and modules of application software, such as program instructions/modules corresponding to the codebook processing method in the embodiment of the present disclosure. The processor 302 executes the software programs and modules stored in the memory 304 to perform various function applications and data processing, that is, to implement the method described above. The memory 304 may include a high-speed random access memory, or may further include a nonvolatile memory such as one or more magnetic storage apparatuses, flash memories or other non-volatile solid-state memories. In some examples, the memory 304 may further include memories that are disposed remote from the processor 302. These remote memories may be connected to the mobile terminal 30 via a network. Examples of the preceding network include, but are not limited to, the Internet, an intranet, a local area network, a mobile communication network and combinations thereof.

The transmission apparatus 306 is configured to receive or send data via a network. Examples of the above network may include a wireless network provided by a communication provider of the mobile terminal 30. In one example, the transmission apparatus 306 includes a network interface controller (NIC), which may be connected to other network devices via a base station and thus is capable of communicating with the Internet. In one example, the transmission apparatus 306 may be a radio frequency (RF) module, which is used for communicating with the Internet in a wireless way.

Figure 4:
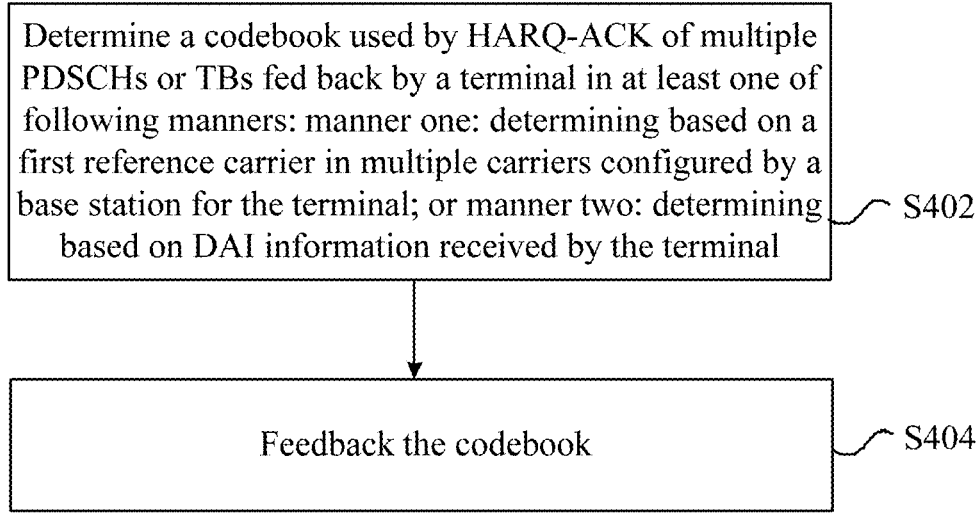
FIG. 4 is a flowchart of a codebook processing method according to an embodiment of the present disclosure.

FIG. 4 is a flowchart of a codebook processing method according to an embodiment of the disclosure, and as shown in FIG. 4, the method includes steps described below.

In step S402: a codebook used by HARQ-ACKs of multiple PDSCHs or TBs fed back by a terminal is determined in at least one of following manners: manner one: the codebook is determined based on a first reference carrier in multiple carriers configured by a base station for the terminal; or manner two: the codebook is determined based on DAI information received by the terminal.

In step S404, the codebook is fed back.

Through the above steps, the codebook multiplexed by the HARQ-ACKs of the multiple PDSCHs or TBs fed back by the terminal is determined based on the first reference carrier configured for the terminal and/or the DAI information received by the terminal, and the codebook is fed back, so that the codebook used by the base station and the codebook used by the terminal can be ensured to be consistent when the HARQ-ACKs of the multiple PDSCHs or TBs are multiplexed together. Therefore, according to the embodiment of the present disclosure, the codebook sizes used between the base station and the UE are consistent and the bit orders of the codebooks used between the base station and the UE are consistent.

It should be noted that the above codebook may be a dynamic codebook or a fixed codebook, but it is not limited thereto.

It should be noted that, when the above codebook is determined in the manner one, a scheduling unit group in part or all of the multiple carriers and aligned with a first specified scheduling unit in the first reference carrier uses a pre-agreed fixed codebook.

It should be noted that the above scheduling unit group includes multiple scheduling units in the part or all of the multiple carriers and aligned with the first specified scheduling unit. It should be noted that each scheduling unit group may correspond to an HARQ-ACK with multiple bits, or an entire scheduling unit group uses one bit, and an HARQ-ACK bundling mechanism may be used among multiple scheduling units in one scheduling unit group, but it is not limited thereto.

In this way, the scheduling units with the shorter time duration are grouped. The time durations of the scheduling units in each group are the same as that of the first specified scheduling unit in the first reference carrier and the codebook of the scheduling units in each group is fixed. Therefore, multiple carriers may be processed by being considered as multiple carriers with the same "scheduling-unit time duration".

It should be noted that the fixed codebook described in this embodiment may also be called a semi-static codebook, but it is not limited thereto.

It should be noted that the step in which the codebook is determined based on the first reference carrier in multiple carriers configured by the base station for the terminal may be represented as followings steps: one or more scheduling unit groups included in the multiple carriers are determined according to the first reference carrier, a first codebook corresponding to the one or more scheduling unit groups is determined according to the one or more scheduling unit groups, a second codebook is determined according to a scheduling unit in the first reference carrier and a scheduling unit in a carrier whose scheduling-unit time duration is the same as a scheduling-unit time duration of the first reference carrier, and the first codebook and the second codebook are determined as the codebook; or one or more scheduling unit groups included in the multiple carriers are determined according to the first reference carrier, and the codebook is determined according to a frequency-domain priority rule and according to scheduling units and the scheduling unit group in the multiple carriers.

It should be noted that a composition of the codebook includes at least one of the followings: in the case where the codebook is a dynamic codebook, and at least one scheduling unit in a scheduling unit group transmits the multiple PDSCHs or TBs, a corresponding HARQ-ACK is composed according to a pre-agreed fixed codebook corresponding to the scheduling unit group; and in the case where no scheduling unit in the scheduling unit group transmits the multiple PDSCHs or TBs, the scheduling unit group does not compose the corresponding HARQ-ACK; or in the case where the codebook is a fixed codebook, for each scheduling unit group, a corresponding HARQ-ACK is composed according to a pre-agreed fixed codebook corresponding to the each scheduling unit group.

It should be noted that the step in which the codebook is fed back includes at least one of following steps: a TB-level HARQ-ACK for each PDSCH or TB is formed according to the number of PDSCHs or TBs transmitted in the scheduling unit group; a CBG-level HARQ-ACK for each PDSCH or TB is formed according to the number of PDSCHs or TBs transmitted in the scheduling unit group; or a bundled fixed codebook is formed according to PDSCHs or TBs transmitted in the scheduling unit group, where the bundled fixed codebook is used for feeding back a TB-level HARQ-ACK or a CBG-level HARQ-ACK.

It should be noted that the first specified scheduling unit is the last scheduling unit in the first reference carrier within a time period from an occasion starting to schedule the multiple PDSCHs or TBs to an occasion stopping to schedule the multiple PDSCHs or TBs.

It should be noted that the scheduling unit group includes at least one of: within a time period from an occasion starting to schedule the multiple PDSCHs or TBs to an occasion stopping to schedule the multiple PDSCHs or TBs, a scheduling unit group corresponding to the last scheduling unit in the first reference carrier; within a time period from an occasion starting to schedule the multiple PDSCHs or TBs to an occasion stopping to schedule the multiple PDSCHs or TBs, a scheduling unit group in the part or all of the multiple carriers and corresponding to a starting position of the last scheduling unit in the first reference carrier; or within a time period from an occasion starting to schedule the multiple PDSCHs or TBs to an occasion stopping to schedule the multiple PDSCHs or TBs, a scheduling unit group in which a PDSCH or a TB has been transmitted at a starting position of the last scheduling unit in the first reference carrier.

It should be noted that the first reference carrier is at least one of: a carrier with the minimum subcarrier spacing in the multiple carriers; a carrier with the longest scheduling-unit time duration in the multiple carriers; a configured reference carrier; or a predetermined reference carrier.

In an embodiment of the present disclosure, before the codebook is determined based on the manner two, the above method may further include at least one of steps of: at a scheduling occasion of a scheduling unit in which the last PDSCH or TB of multiple scheduled PDSCHs or TBs is located or within a scheduling unit in which the last PDSCH or TB is located, DCI carrying the DAI information sent by the base station by using a mini-slot is listened; or a predetermined amount of DCI carrying the DAI information sent by the base station is listened at a public DCI listening occasion set for a carrier configured for the terminal.

It should be noted that the DCI in the mini-slot is allowed to not schedule user data. That is, the mini-slot may not carry the user data, that is, may send only the DCI carrying the DAI, thereby improving the reliability of the terminal receiving the DCI carrying DAI at the end of the scheduling.

It should be noted that the above method may be applied to at least one of following scenarios, but is not limited thereto: a single carrier is configured for the terminal; multiple carriers with different scheduling-unit time durations are configured for the terminal; multiple carriers with different subcarrier spacings are configured for the terminal; or multiple carriers with the same subcarrier spacing are configured for the terminal.

In some embodiments, the step in which the DCI carrying the DAI information sent by the base station by using the mini-slot is listened may be represented as followings steps: the mini-slot is listened carried through a first specified carrier at a sending occasion of DCI corresponding to the last PDSCH or TB, where the mini-slot carries the DCI of the DAI information, and the first specified carrier is different from a carrier carrying the last PDSCH or TB.

It should be noted that the sum of the number of first specified carriers and the number of second specified carriers is greater than or equal to a required number. In the case where the required number is the minimum number of DCI sending times required by the terminal to correctly detect the DCI once, the second specified carriers are carriers whose scheduling-unit time duration is the same as a time duration of a scheduling unit in which the last PDSCH or TB is located.

In an embodiment of the present disclosure, the public DCI listening occasion is a position aligned with a DCI sending occasion of a second specified scheduling unit in a second reference carrier and in part or all of the multiple carriers configured for the terminal. The reliability of receiving DCI carrying the DAI can be ensured through configuring the public DCI listening occasion.

It should be noted that the second reference carrier may be determined in at least one of following manners: a carrier with the minimum subcarrier spacing in the part or all of the multiple carriers is determined as the second reference carrier; a carrier with the longest scheduling-unit time duration in the part or all of the multiple carriers is determined as the second reference carrier; in the case where the number of carriers with a first subcarrier spacing in the part or all of the multiple carriers is greater than or equal to a predetermined threshold value, the second reference carrier is located in the carriers with the first subcarrier spacing; in the case where the number of carriers with the first subcarrier spacing in the part or all of the multiple carriers is less than the predetermined threshold value, and the sum of the number of carriers with a second subcarrier spacing and the number of carriers with the first subcarrier spacing in the part or all of the multiple carriers is greater than or equal to the predetermined threshold value, the second reference carrier is located in the carriers with the second subcarrier spacing; a reference carrier configured for the terminal is determined as the second reference carrier; or a pre-agreed reference carrier is determined as the second reference carrier.

It should be noted that the above first subcarrier spacing is greater than or equal to the second subcarrier spacing, but it is not limited thereto.

It should be noted that the second specified scheduling unit is the last scheduling unit in the second reference carrier within a time period from an occasion starting to schedule the multiple PDSCHs or TBs to an occasion stopping to schedule the multiple PDSCHs or TBs.

It should be noted that the number of all of the multiple carriers is greater than or equal to a predetermined value.

It should be noted that the above steps may, but may not necessarily, be executed by a terminal.

According to the description of the embodiments described above, it will be apparent to those skilled in the art that the methods in the embodiments described above may be implemented by software plus a necessary general-purpose hardware platform, or of course, may be implemented by hardware. However, in many cases, the former is a preferred implementation mode. Based on this understanding, the technical scheme of the present disclosure substantially, or the part contributing to the existing art, may be embodied in the form of a software product. The computer software product is stored on a storage medium (such as a read-only memory (ROM)/random access memory (RAM), a magnetic disk or an optical disk) and includes several instructions for enabling a terminal device (which may be a mobile phone, a computer, a server or a network device) to execute the methods described in the embodiments of the present disclosure.

An embodiment of the present disclosure further provides an information decoding apparatus. The apparatus is configured to implement the above embodiments and preferred implementation modes. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceivable.

Figure 5:
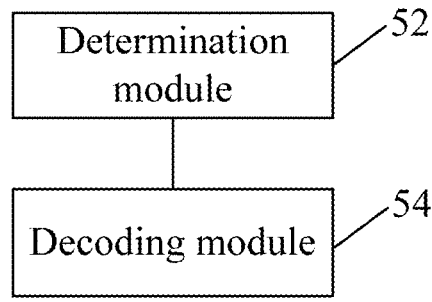
FIG. 5 is a structural block diagram of an information decoding apparatus according to an embodiment of the present disclosure.

FIG. 5 is a structural block diagram of an information decoding apparatus according to an embodiment of the present disclosure. As shown in FIG. 5, the apparatus includes a determination module 52 and a decoding module 54.

The determination module 52 is configured to determine a codebook multiplexed by HARQ-ACKs of multiple PDSCHs or TBs fed back by a terminal in at least one of following manners: manner one: determine the codebook based on a first reference carrier in multiple carriers configured for the terminal; or manner two: determine the codebook based on DAI information sent to the terminal.

The decoding module 54 is connected to the determination module 52, and is configured to decode the codebook.

According to the above apparatus, the codebook multiplexed by the HARQ-ACKs of the multiple PDSCHs or TBs fed back by the terminal is determined based on the first reference carrier configured for the terminal and/or the DAI information sent to the terminal, and the codebook is decoded, so that the codebook used by the base station and the codebook used by the terminal can be ensured to be consistent when the HARQ-ACKs of the multiple PDSCHs or TBs are multiplexed together. Therefore, according to the embodiment of the present disclosure, the codebook sizes used between the base station and the UE are consistent and the bit orders of the codebooks used between the base station and the UE are consistent.

It should be noted that, the above codebook may be a dynamic codebook or a fixed codebook, but it is not limited thereto. It should be noted that in the case where the determination module 52 determines the codebook in the manner one, each scheduling unit group in part or all of the multiple carriers and aligned with a first specified scheduling unit in the first reference carrier uses a pre-agreed fixed codebook.

It should be noted that the above scheduling unit group includes multiple scheduling units in the part or all of the multiple carriers and aligned with the first specified scheduling unit. It should be noted that each scheduling unit group may correspond to an HARQ-ACK with multiple bits, or an entire scheduling unit group uses one bit, and an HARQ-ACK bundling mechanism may be used among multiple scheduling units in one scheduling unit group, but it is not limited thereto.

In this way, the scheduling units with the shorter time duration are grouped. The time durations of the scheduling units in each group are the same as that of the first specified scheduling unit in the first reference carrier and the codebook of the scheduling units in each group is fixed. Therefore, multiple carriers may be processed by being considered as multiple carriers with the same "scheduling unit time duration".

It should be noted that the fixed codebook described in this embodiment may also be called a semi-static codebook, but it is not limited thereto.

It should be noted that the determination module 52 is further configured to determine one or more scheduling unit groups included in the multiple carriers according to the first reference carrier, determine a first codebook corresponding to the one or more scheduling unit groups according to the one or more scheduling unit groups, determine a second codebook according to a scheduling unit in the first reference carrier and a scheduling unit in a carrier whose scheduling-unit time duration is the same as a scheduling-unit time duration of the first reference carrier, and determine the first codebook and the second codebook as the codebook; or determine one or more scheduling unit groups included in the multiple carriers according to the first reference carrier, and determine the codebook according to a frequency-domain priority rule and according to scheduling units and the scheduling unit group in the multiple carriers.

It should be noted that a composition of the codebook includes at least one of the followings: in the case where the codebook is a dynamic codebook, and at least one scheduling unit in a scheduling unit group transmits the multiple PDSCHs or TBs, a corresponding HARQ-ACK is composed according to a pre-agreed fixed codebook corresponding to the scheduling unit group; and in the case where no scheduling unit in the scheduling unit group transmits the multiple PDSCHs or TBs, the scheduling unit group does not compose the corresponding HARQ-ACK; or in the case where the codebook is a fixed codebook, for each scheduling unit group, a corresponding HARQ-ACK is composed according to a pre-agreed fixed codebook corresponding to the each scheduling unit group.

It should be noted that an HARQ-ACK corresponding to the scheduling unit group may include at least one of: a TB-level HARQ-ACK formed for each PDSCH or TB according to the number of PDSCHs or TBs transmitted in the scheduling unit group; a CBG-level HARQ-ACK formed for each PDSCH or TB according to the number of PDSCHs or TBs transmitted in the scheduling unit group; or a TB-level HARQ-ACK or a CBG-level HARQ-ACK fed back according to a fixed codebook bundled by PDSCHs or TBs transmitted in the scheduling unit group.

It should be noted that the first specified scheduling unit is the last scheduling unit in the first reference carrier within a time period from an occasion starting to schedule the multiple PDSCHs or TBs to an occasion stopping to schedule the multiple PDSCHs or TBs. In this way, the codebook overhead can be reduced and the flexibility can be improved.

It should be noted that the scheduling unit group includes at least one of: within a time period from an occasion starting to schedule the multiple PDSCHs or TBs to an occasion stopping to schedule the multiple PDSCHs or TBs, a scheduling unit group corresponding to the last scheduling unit in the first reference carrier; within a time period from an occasion starting to schedule the multiple PDSCHs or TBs to an occasion stopping to schedule the multiple PDSCHs or TBs, a scheduling unit group in the part or all of the multiple carriers and corresponding to a starting position of the last scheduling unit in the first reference carrier; or within a time period from an occasion starting to schedule the multiple PDSCHs or TBs to an occasion stopping to schedule the multiple PDSCHs or TBs, a scheduling unit group in which a PDSCH or a TB has been transmitted at a starting position of the last scheduling unit in the first reference carrier.

It should be noted that the first reference carrier is at least one of: a carrier with the minimum subcarrier spacing in the multiple carriers; a carrier with the longest scheduling-unit time duration in the multiple carriers; a reference carrier configured for the terminal; or a predetermined reference carrier.

In an embodiment of the present disclosure, the above apparatus further includes a first sending module and a second sending module. The first sending module is connected to the determination module 52, and is configured to, at a scheduling occasion of a scheduling unit in which the last PDSCH or TB of multiple scheduled PDSCHs or TBs is located or within a scheduling unit in which the last PDSCH or TB is located, send the DAI information to the terminal by using DCI in a mini-slot. The second sending module is connected to the determination module 52, and is configured to send a predetermined amount of DCI carrying the DAI information to the terminal at a public DCI listening occasion set for a carrier configured for the terminal.

It should be noted that the DCI in the mini-slot is allowed to not schedule user data. That is, the mini-slot may not carry the user data, that is, may sent only the DCI carrying the DAI, thereby improving the reliability of the terminal receiving the DCI carrying DAI at the end of the scheduling.

It should be noted that the apparatus may be applied to at least one of following scenarios, but is not limited thereto: a single carrier is configured for the terminal; multiple carriers with different scheduling-unit time durations are configured for the terminal; multiple carriers with different subcarrier spacings are configured for the terminal; or multiple carriers with the same subcarrier spacing are configured for the terminal.

In some embodiments, the operation of sending the DAI information to the terminal by using the DCI in the mini-slot may include an operation of carrying the mini-slot through a first specified carrier at a sending occasion of DCI corresponding to the last PDSCH or TB, where the mini-slot carries the DCI of the DAI information, and the first specified carrier is different from a carrier carrying the last PDSCH or TB.

It should be noted that the sum of the number of first specified carriers and the number of second specified carriers is greater than or equal to a required number. In the case where the required number is the minimum number of DCI sending times required by the terminal to correctly detect the DCI once, the second specified carriers are carriers whose scheduling-unit time duration is the same as a time duration of a scheduling unit in which the last PDSCH or TB is located.

It should be noted that the amount of sent DCI is greater than or equal to a required amount, where the required amount is the minimum number of DCI sending times required by the terminal to correctly detect the DCI once.

Through configuring the required amount, it can be ensured that the terminal may correctly detect the DCI, thereby the reliability of receiving the DCI carrying the DAI is ensured.

In an embodiment of the present disclosure, the public DCI listening occasion is a position aligned with a DCI sending occasion of a second specified scheduling unit in a second reference carrier and in part or all of the multiple carriers configured for the terminal. The reliability of receiving DCI carrying the DAI may be ensured through configuring the public DCI listening occasion.

It should be noted that the determination module 52 may be further configured to determine the second reference carrier in at least one of following manners: determining a carrier with the minimum subcarrier spacing in the part or all of the multiple carriers as the second reference carrier; determining a carrier with the longest scheduling-unit time duration in the part or all of the multiple carriers as the second reference carrier; in the case where the number of carriers with a first subcarrier spacing in the part or all of the multiple carriers is greater than or equal to a predetermined threshold value, the second reference carrier being located in the carriers with the first subcarrier spacing; in the case where the number of carriers with the first subcarrier spacing in the part or all of the multiple carriers is less than the predetermined threshold value, and the sum of the number of carriers with a second subcarrier spacing and the number of carriers with the first subcarrier spacing in the part or all of the multiple carriers is greater than or equal to the predetermined threshold value, the second reference carrier being located in the carriers with the second subcarrier spacing; determining a reference carrier configured for the terminal as the second reference carrier; or determining a pre-agreed reference carrier as the second reference carrier.

It should be noted that the above first subcarrier spacing is greater than or equal to the second subcarrier spacing, but it is not limited thereto.

It should be noted that the second specified scheduling unit is the last scheduling unit in the second reference carrier within a time period from an occasion starting to schedule the multiple PDSCHs or TBs to an occasion stopping to schedule the multiple PDSCHs or TBs.

It should be noted that the number of all of the multiple carriers is greater than or equal to a predetermined value.

It should be noted that the above apparatus may, but may not necessarily, be located in the base station.

The embodiment further provides a codebook processing apparatus. The apparatus is configured to implement the preceding embodiments and preferred implementation modes. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceivable.

Figure 6:
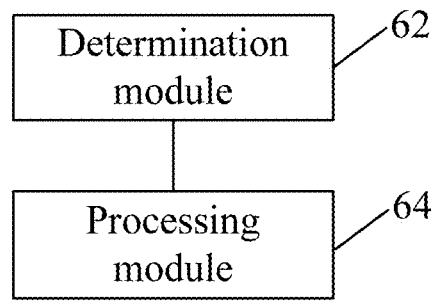
FIG. 6 is a structural block diagram of a codebook processing apparatus according to an embodiment of the present disclosure.

FIG. 6 is a structural block diagram of a codebook processing apparatus according to an embodiment of the present application. As shown in FIG. 6, the apparatus includes a determination module 62 and a processing module 64.

The determination module 62 is configured to determine a codebook multiplexed by HARQ-ACKs of multiple PDSCHs or TBs fed back by a terminal in at least one of following manners: manner one: determine the codebook based on a first reference carrier in multiple carriers configured by a base station for the terminal; or manner two: determine the codebook based on DAI information received by the terminal.

The processing module 64 is connected to the determination module 62, and is configured to feed back the codebook.

According to the above apparatus, the codebook multiplexed by the HARQ-ACKs of the multiple PDSCHs or TBs fed back by the terminal is determined based on the first reference carrier configured for the terminal and/or the DAI information received by the terminal, and the codebook is fed back, so that the codebook used by the base station and the codebook used by the terminal can be ensured to be consistent when the HARQ-ACKs of the multiple PDSCHs or TBs are multiplexed together. Therefore, according to the embodiment of the present disclosure, the codebook sizes used between the base station and the UE are consistent and the bit orders of the codebooks used between the base station and the UE are consistent.

It should be noted that, in the case where the determination module 62 determines the codebook in the manner one, a scheduling unit group in part or all of the multiple carriers and aligned with a first specified scheduling unit in the first reference carrier uses a pre-agreed fixed codebook.

It should be noted that the above scheduling unit group includes multiple scheduling units in the part or all of the multiple carriers and aligned with the first specified scheduling unit. It should be noted that each scheduling unit group may correspond to an HARQ-ACK with multiple bits, or an entire scheduling unit group uses one bit, and an HARQ-ACK bundling mechanism may be used among multiple scheduling units in one scheduling unit group, but it is not limited thereto.

In this way, the scheduling units with the shorter time duration are grouped. The time durations of the scheduling units in each group are the same as that of the first specified scheduling unit in the first reference carrier and the codebook of the scheduling units in each group is fixed. Therefore, multiple carriers may be processed by being considered as multiple carriers with the same "scheduling unit time duration".

It should be noted that the fixed codebook described above may also be called a semi-static codebook, but it is not limited thereto.

It should be noted that the determination module 62 is further configured to determine one or more scheduling unit groups included in the multiple carriers according to the first reference carrier, determine a first codebook corresponding to the one or more scheduling unit groups according to the one or more scheduling unit groups, determine a second codebook according to a scheduling unit in the first reference carrier and a scheduling unit in a carrier whose scheduling-unit time duration is the same as a scheduling-unit time duration of the first reference carrier, and determine the first codebook and the second codebook as the codebook; or determine one or more scheduling unit groups included in the multiple carriers according to the first reference carrier, and determine the codebook according to a frequency-domain priority rule and according to scheduling units and the scheduling unit group in the multiple carriers.

It should be noted that a composition of the codebook includes at least one of the followings: in the case where the codebook is a dynamic codebook, and at least one scheduling unit in a scheduling unit group transmits the multiple PDSCHs or TBs, a corresponding HARQ-ACK is composed according to a pre-agreed fixed codebook corresponding to the scheduling unit group; and in the case where no scheduling unit in the scheduling unit group transmits the multiple PDSCHs or TBs, the scheduling unit group does not compose the corresponding HARQ-ACK; or in the case where the codebook is a fixed codebook, for each scheduling unit group, a corresponding HARQ-ACK is composed according to a pre-agreed fixed codebook corresponding to the each scheduling unit group.

It should be noted that the processing module 64 is further configured to at least one of: forming a TB-level HARQ-ACK for each PDSCH or TB according to the number of PDSCHs or TBs transmitted in the scheduling unit group; forming a CBG-level HARQ-ACK for each PDSCH or TB according to the number of PDSCHs or TBs transmitted in the scheduling unit group; or forming a bundled fixed codebook according to PDSCHs or TBs transmitted in the multiple scheduling unit groups, where the bundled fixed codebook is used for feeding back a TB-level HARQ-ACK or a CBG-level HARQ-ACK.

It should be noted that the first specified scheduling unit is the last scheduling unit in the first reference carrier within a time period from an occasion starting to schedule the multiple PDSCHs or TBs to an occasion stopping to schedule the multiple PDSCHs or TBs.

It should be noted that the scheduling unit group includes at least one of: within a time period from an occasion starting to schedule the multiple PDSCHs or TBs to an occasion stopping to schedule the multiple PDSCHs or TBs, a scheduling unit group corresponding to the last scheduling unit in the first reference carrier; within a time period from an occasion starting to schedule the multiple PDSCHs or TBs to an occasion stopping to schedule the multiple PDSCHs or TBs, a scheduling unit group in the part or all of the multiple carriers and corresponding to a starting position of the last scheduling unit in the first reference carrier; or within a time period from an occasion starting to schedule the multiple PDSCHs or TBs to an occasion stopping to schedule the multiple PDSCHs or TBs, a scheduling unit group in which a PDSCH or a TB has been transmitted at a starting position of the last scheduling unit in the first reference carrier.

It should be noted that the first reference carrier is at least one of: a carrier with the minimum subcarrier spacing in the multiple carriers; a carrier with the longest scheduling-unit time duration in the multiple carriers; a configured reference carrier; or a predetermined reference carrier.

In an embodiment of the present disclosure, the apparatus further includes at least one of: a first listening module and a second listening module. The first listening module is connected to the determination module 62, and is configured to listen DCI carrying the DAI information sent by the base station by using a mini-slot at a scheduling occasion of a scheduling unit in which the last PDSCH or TB of multiple scheduled PDSCHs or TBs is located or within a scheduling unit in which the last PDSCH or TB is located. The second monitoring module is connected to the determination module 62, and is configured to listen a predetermined amount of DCI carrying the DAI information sent by the base station at a public DCI listening occasion set for a carrier configured for the terminal.

It should be noted that the DCI in the mini-slot is allowed to not schedule user data. That is, the mini-slot may not carry the user data, that is, may sent only the DCI carrying the DAI, thereby improving the reliability of the terminal receiving the DCI carrying DAI at the end of the scheduling.

It should be noted that the apparatus may be applied to at least one of following scenarios, but is not limited thereto: a single carrier is configured for the terminal; multiple carriers with different scheduling-unit time durations are configured for the terminal; multiple carriers with different subcarrier spacings are configured for the terminal; or multiple carriers with the same subcarrier spacing are configured for the terminal.

In some embodiments, the operation of listening the DCI carrying the DAI information sent by the base station by using the mini-slot may be represented as the operations of: listening the mini-slot carried through a first specified carrier at a sending occasion of DCI corresponding to the last PDSCH or TB, where the mini-slot carries the DCI of the DAI information, and the first specified carrier is different from a carrier carrying the last PDSCH or TB.

It should be noted that the sum of the number of first specified carriers and the number of second specified carriers is greater than or equal to a required number. In the case where the required number is the minimum number of DCI sending times required by the terminal to correctly detect the DCI once, the second specified carriers are carriers whose scheduling-unit time duration is the same as a time duration of a scheduling unit in which the last PDSCH or TB is located.

In an embodiment of the present disclosure, the public DCI listening occasion is a position aligned with a DCI sending occasion of a second specified scheduling unit in a second reference carrier and in part or all of the multiple carriers configured for the terminal. The reliability of receiving DCI carrying the DAI may be ensured through configuring the public DCI listening occasion.

It should be noted that the determination module 62 may further determine the second reference carrier in at least one of following manners: determining a carrier with the minimum subcarrier spacing in the part or all of the multiple carriers as the second reference carrier; determining a carrier with the longest scheduling-unit time duration in the part or all of the multiple carriers as the second reference carrier; in the case where the number of carriers with a first subcarrier spacing in the part or all of the multiple carriers is greater than or equal to a predetermined threshold value, the second reference carrier being located in the carriers with the first subcarrier spacing; in the case where the number of carriers with the first subcarrier spacing in the part or all of the multiple carriers is less than the predetermined threshold value, and the sum of the number of carriers with a second subcarrier spacing and the number of carriers with the first subcarrier spacing in the part or all of the multiple carriers is greater than or equal to the predetermined threshold value, the second reference carrier being located in the carriers with the second subcarrier spacing; determining a reference carrier configured for the terminal as the second reference carrier; or determining a pre-agreed reference carrier as the second reference carrier.

It should be noted that the above first subcarrier spacing is greater than or equal to the second subcarrier spacing, but it is not limited thereto.

It should be noted that the second specified scheduling unit is the last scheduling unit in the second reference carrier within a time period from an occasion starting to schedule the multiple PDSCHs or TBs to an occasion stopping to schedule the multiple PDSCHs or TBs.

It should be noted that the number of all of the multiple carriers is greater than or equal to a predetermined value.

It should be noted that the above steps may, but may not necessarily, be executed by a terminal.

It should to be noted that preceding each module may be implemented by software or hardware. Implementation by hardware may, but may not necessarily, be performed in the following manners: the preceding modules are each located in the same processor, or the preceding modules are located in respective processors in any combination form.

An embodiment of the present disclosure further provides a storage medium. The storage medium includes stored programs. The programs, when executed, perform the method of any one of the embodiments described above.

In some embodiments, the storage medium may include, but is not limited to, a Universal Serial Bus (USB) flash disk, an ROM, an RAM, a mobile hard disk, a magnetic disk, an optical disk or another medium capable of storing program codes.

An embodiment of the present disclosure further provides a processor. The processor is configured to execute programs. The programs, when executed, perform the steps of the method of any one of the embodiments described above.

Another embodiment of the present disclosure further provides an electronic device. The electronic device includes a memory, a processor and computer programs stored in the memory and executable on the processor. The processor is configured to execute, through the computer programs, the method of any one of the embodiments described above.

In some embodiments, for examples in this embodiment, reference may be made to the examples described in the embodiments and implementation modes described above, which will not be repeated in this embodiment.

To better understand the present disclosure, the present disclosure will be further described below in conjunction with embodiments.

At a scheduling occasion of an end (which is equivalent to the last TB in the above embodiment) of multiple TBs (HARQ-ACKs of the multiple TBs are required to be multiplexed) or with the last scheduling unit in this scheduling, the mini-slot mechanism is used for providing a sending opportunity for the DCI carrying the DAI. This manner may be applied to multiple carriers or may be used for a single carrier. The mini-slot carrying the DAI may not carry the user data, that is, only may sent the DCI carrying the DAI to improve the reliability of receiving the DCI carrying the DAI at the end of this scheduling.

Among multiple carriers with different SCSs configured for the UE, the PDSCH or TB is sent to the UE in each carrier, and the HARQ-ACKs corresponding to these PDSCHs or TBs are required to be multiplexed together for feedback. In order to prevent UE from losing part of the PDSCHs or TBs, a DAI mechanism is introduced. Since the DAI is carried by the DCI, the probability of losing the DCI is 1%, and in order to ensure the reliability of receiving the DAI, it is recommended to send the DAI in the following manner. It is assumed here that the UE detects the DCI 4 times (4 times is just an example, and the number of times may be adjusted according to requirements), and the DCI is correctly detected at least once, that is, when 4 times of DCI detections are provided, it can be ensured that the DCI may be detected in at least one detection. In this way, a total DAI carried in the DCI will tell the UE the codebook size to be fed back in this time. At the same moment, when the base station sends the TB in different CCs, the total DAI will be used for marking the codebook size that the UE needs to feed back after this sending. For the DAI mechanism, reference may be made to the description in the LTE 36.213 protocol.

The step in which information carrying the DAI is sent through the mini-slot at the scheduling unit where the required multiple PDSCHs or TBs end includes steps described below.

Figure 7:
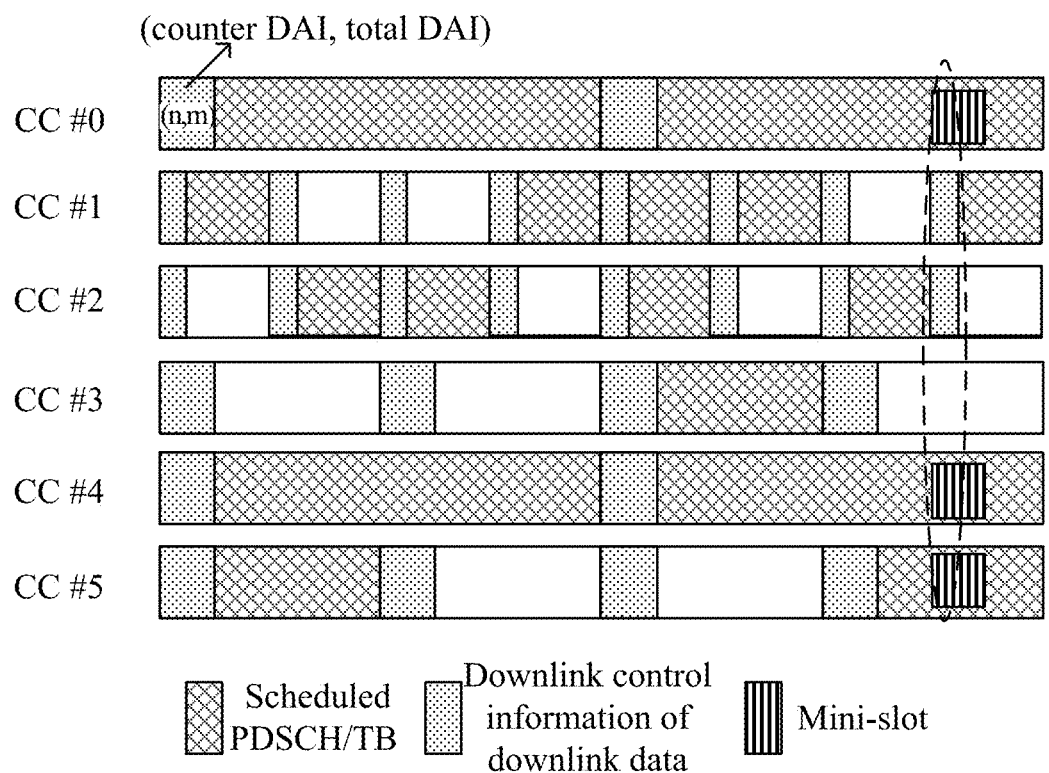
FIG. 7 is a schematic diagram of carrying DAI information at the end of scheduling through a mini-slot according to an embodiment.

The base station carries the DAI information through the DCI in the mini-slot among other carriers (which is equivalent to the first specified carrier in the above embodiment) at the transmission end of a carrier (i.e., a carrier with the shortest scheduling-unit time duration) (which is equivalent to the carrier carrying the last PDSCH or TB in the above embodiment) with the largest SCS in carriers in which the PDSCH or the TB is transmitted among the multiple carriers. The number of other carriers satisfies the followings: the sum of the number of other carriers and the number of carriers at the transmission end is equal to or greater than the required number, for example, the required number is 4 times, that is, at least how many times of DCI detections is required for correctly detecting the DCI once. The other carriers may be carriers carrying the TB, such as CC #0 in FIG. 7, or CC #3 not carrying the TB. FIG. 7 is a schematic diagram of carrying the DAI information at the end of scheduling through the mini-slot according to the embodiment.

For example, in FIG. 7, the HARQ-ACKs of the illustrated TBs are required to be multiplexed together for transmission. In this case, the end of the transmission is the last TB of CC #2, that is, among the multiple TBs, the DCI corresponding to the TB is the latest to be sent. In this case, the mini-slot is scheduled at the DCI sending occasion, such as the mini-slot is scheduled at CC #0, CC #4, and CC #5, and the DAI information is carried through the DCI of the mini-slot, and the DAI information carried by DCI in CC #1, so that there are four pieces of DCI carrying the DAI at the end of this scheduling. In this way, the UE receives the DCI at least once to obtain the DAI information of the DCI. At this time, a counter DAI carried in these four pieces of DCI at the end is accumulated one by one (if it is uplink authorized DCI, only the total DAI may be provided), where the total DAI is same.

The mini-slot is a slot structure in the NR, the position of the mini-slot in the scheduling unit is flexible, and has its own DCI.

For multiple carriers configured for the UE, these carriers have different SCSs or different scheduling-unit time durations. One manner is to configure multiple scheduling units of other carriers corresponding to the scheduling-unit time duration to be a scheduling unit group according to the scheduling-unit time duration of the reference carrier. This scheduling unit group uses a fixed codebook (for example, each scheduling unit corresponds to an HARQ-ACK with n bits, or an entire scheduling unit group uses one bit, and an HARQ-ACK bundling mechanism is used among the scheduling units in the group). The reference carrier may be configured by the base station and then the UE is notified of. The reference carrier may also be pre-agreed by the base station and the UE. According to this manner, the scheduling units with the shorter time duration are grouped. The time durations of the scheduling units in each group are the same as that of the reference carrier scheduling unit and the codebook of the scheduling units in each group is fixed. In this case, multiple carriers may be processed by being considered as multiple carriers with the same "scheduling unit time duration".

Figure 8:
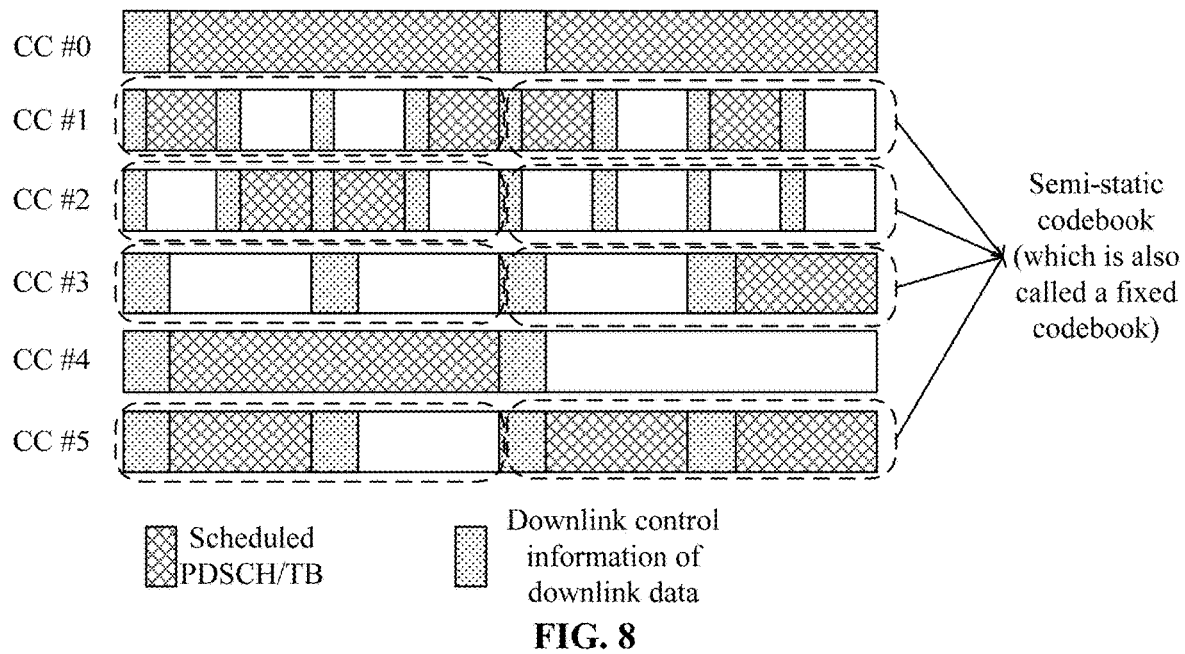
FIG. 8 is a schematic diagram of grouping scheduling units of other carriers according to a scheduling-unit time duration of a reference carrier according to an embodiment of the present disclosure.

One reference carrier is determined among multiple carriers, according to one (or more) scheduling unit(s) (that is, reference unit, which is equivalent to the first specified scheduling unit in the above embodiment) of the reference carrier (which is equivalent to the first reference carrier in the above embodiment), multiple scheduling units of other carriers are grouped into one group correspondingly, that is, in other carriers, multiple scheduling units with the shorter time duration and aligned with one reference unit are grouped into one group and marked as a fixed codebook (the scheduling units are grouped into one group just for ease of description, and its essence is that multiple scheduling units of other carriers corresponding to one scheduling unit of the reference carrier use the fixed codebook). The reference carrier may be the carrier with the minimum SCS, or the carrier with the longest scheduling-unit time duration. The reference carrier may be obtained by default according to an agreed rule, or may be configured by the base station for the UE. If the reference carrier is obtained by default according to the agreed rule, it may be agreed as the carrier with the minimum SCS among the multiple carriers configured for the UE (or may be agreed as a carrier for transmitting data for the UE). FIG. 8 is a schematic diagram of grouping scheduling units of other carriers according to a scheduling-unit time duration of a reference carrier according to an embodiment of the present disclosure.

For example, in FIG. 8, carriers with three different SCSs are provided, and correspondingly, scheduling units with three different time durations are provided. For example, CC #0 or CC #4 is used as the reference carrier, and one scheduling unit in the reference carrier is used as a reference unit. Four scheduling units aligned with one reference unit in CC #2 and CC #3 are grouped into one group and taken as a fixed codebook. For example, the HARQ-ACK fed back fixedly is 4 bits, and the data in each scheduling unit corresponds to one bit. As long as one of the four scheduling units transmits data, 4 bits also need to be fed back, and the other three scheduling units may feed back a filling bit such as filling 0. If no data is transmitted in these four scheduling units, and a dynamic codebook is provided, there is no need to feed back the HARQ-ACK. If a fixed codebook is provided, the HARQ-ACK of 4 bits still needs to be fed back.

The carrier corresponding to the reference unit may be configured by the base station for the UE. In this case, the scheduling units in other carriers may be divided according to the scheduling units in the reference carrier. The scheduling units in other carriers may be regarded as being grouped, and each group uses the fixed codebook. In this way, it is equivalent that the scheduling units in the carrier (other carriers according to the scheduling unit group) with the different SCSs are aligned. Therefore, multiple carriers with different SCSs may be converted into carriers with same SCS to determine the codebook size of multiple TBs. In this case, it is only need to use the agreed fixed codebook for each scheduling unit group.

CC #3 may also be selected as the reference carrier, and then two scheduling units, CC #1 and CC #2, are grouped into one group, Each group has two scheduling units, and a corresponding feedback bit is 2 bits.

The embodiment is applied to the scheduling unit at the end of multiple TBs scheduled this time based on the manner in the previous embodiment, so that the overhead is reduced and the flexibility is improved.

The rule of grouping the scheduling units of other carriers according to the scheduling-unit time duration of the reference carrier in the previous embodiment is only applied to the scheduling unit (which is equivalent to the last scheduling unit in the first reference carrier within a time period from an occasion starting to schedule the multiple PDSCHs or TBs to an occasion stopping to schedule the multiple PDSCHs or TBs in the above embodiment) at the end in which the HARQ-ACKs corresponding to multiple PDSCHs/TBs are multiplexed together.

Figure 9:
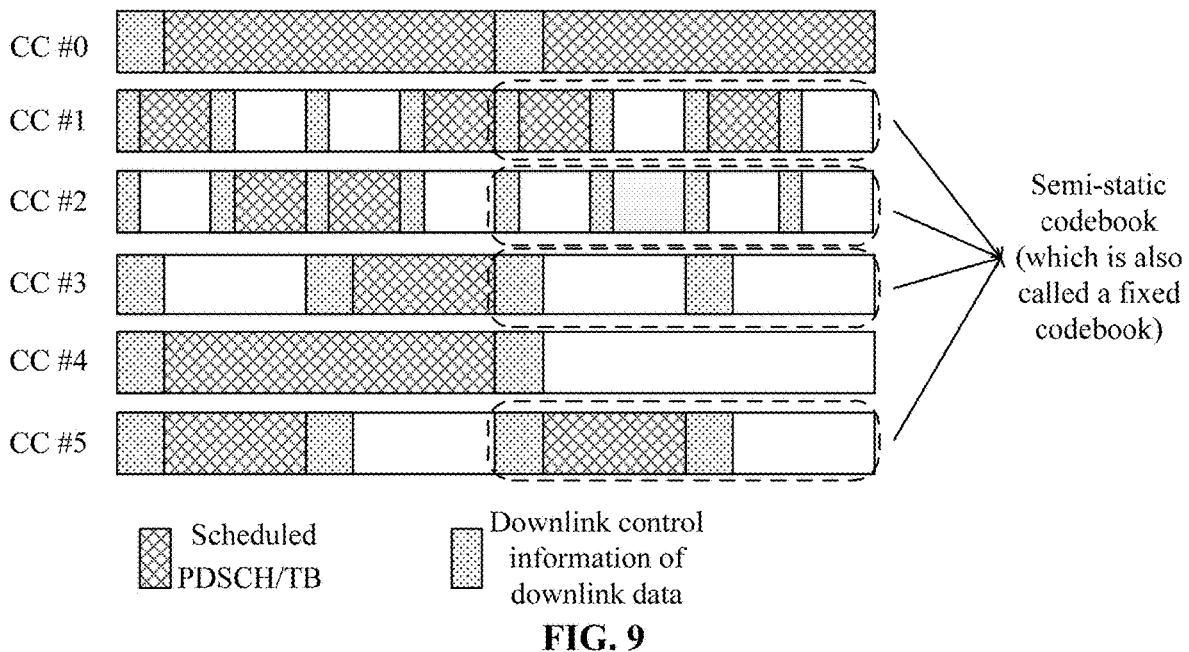
FIG. 9 is a schematic diagram of grouping scheduling units of other carriers according to a time duration of a scheduling unit at the end of a reference carrier according to an embodiment of the present disclosure.

The determination of the reference carrier (which is equivalent to the first reference carrier in the above embodiment) may be as that in any of the above embodiments. The scheduling unit at the end is the scheduling unit at the end of the reference carrier in multiple PDSCHs or TBs scheduled this time (the end may also be determined by the size of a bundling window, that is, it is specified in advance that the HARQ-ACKs of multiple TBs are multiplexed together with in a bundling window, an end position of the bundling window may be informed to the UE or implicitly obtained by the UE through an agreed rule). The scheduling unit at the end of the reference carrier may not actually schedule the TB, but the scheduling units of the corresponding other carriers need to have data. For example, in FIG. 9, when CC #4 is configured as the reference carrier, the scheduling unit at the end does not schedule the TB in CC #4, but the TB is transmitted in the scheduling units of the corresponding other carriers. The HARQ-ACK of the TB transmitted after the scheduling unit at the end is not multiplexed with the HARQ-ACKs of the multiple TBs. FIG. 9 is a schematic diagram of grouping the scheduling units of other carriers according to the time duration of the scheduling unit at the end of the reference carrier according to an embodiment of the present disclosure.

Figure 10:
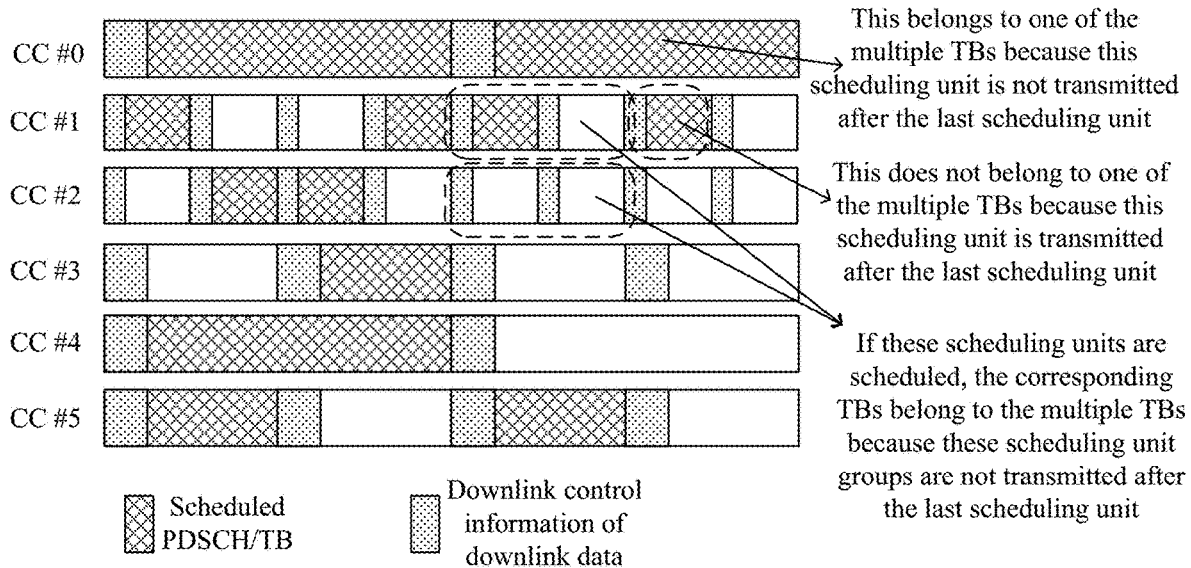
FIG. 10 is a schematic diagram of grouping scheduling units of other carriers according to a time duration of a scheduling unit at the end of a reference carrier according to an embodiment of the present disclosure.

In this way, the TB newly transmitted in the scheduling unit group of other carriers within the time duration of the scheduling unit at the end or the TB that has been transmitted from the beginning of the scheduling unit at the end belongs to the multiple TBs. The formation of the HARQ-ACK corresponding to each scheduling unit group is the same as that in the previous embodiment. The TB newly transmitted in the scheduling unit or the TB transmitted in the scheduling unit group after the scheduling unit at the end does not belong to the multiple TBs. For similar content, reference may be made to FIG. 10. FIG. 10 is a schematic diagram of grouping scheduling units of other carriers according to a time duration of a scheduling unit at the end of a reference carrier according to an embodiment of the present disclosure.

Compared with the previous embodiment, in this embodiment, the overhead is less. Since the number of the grouped scheduling units in other carriers is reduced, the overhead of using the fixed codebook of the grouped scheduling units is reduced. In this way, the grouped scheduling units in other carriers only occur in the scheduling unit at the end, so that the total codebook size is significantly reduced.

In FIG. 10, the reference carrier is specified as CC #5, and the scheduling unit at the end is a penultimate scheduling unit of CC #5 in FIG. 10, so that CC #1 and CC #2 will have the scheduling unit group. The TB scheduled within the scheduling unit group at the end of these two CCs still belongs to the multiple TBs. The TB scheduled later does not belong to the multiple TBs. For the last scheduling unit of CC #0, since it is transmitted at the same time as the scheduling unit at the end, it also belongs to the multiple TBs.

In this embodiment, for multiple carriers configured for the UE, these carriers have different SCSs or different scheduling-unit time durations, and a public DCI listening occasion (which is equivalent to the public DCI listening occasion in the above embodiments) is configured as the last occasion for listening the DCI carrying the DAI of the TB scheduled this time for the multiple carriers, thereby ensuring the reliability of receiving the DCI carrying the DAI.

When multiple carriers are configured for the UE and the multiple carriers have different SCSs, if multiple TBs are scheduled and transmitted in the multiple carriers, and the HARQ-ACKs of these TBs are required to be multiplexed together for feedback, when the dynamic codebook is used and the DAI is transmitted, the number of DCI carrying the DAI information at the end of DCI listening occasion sent by the base station needs to be less than the required number, to ensure that the UE may receive the DAI at the end of DCI listening occasion. For example, the required number is 4 times.

Figure 11:
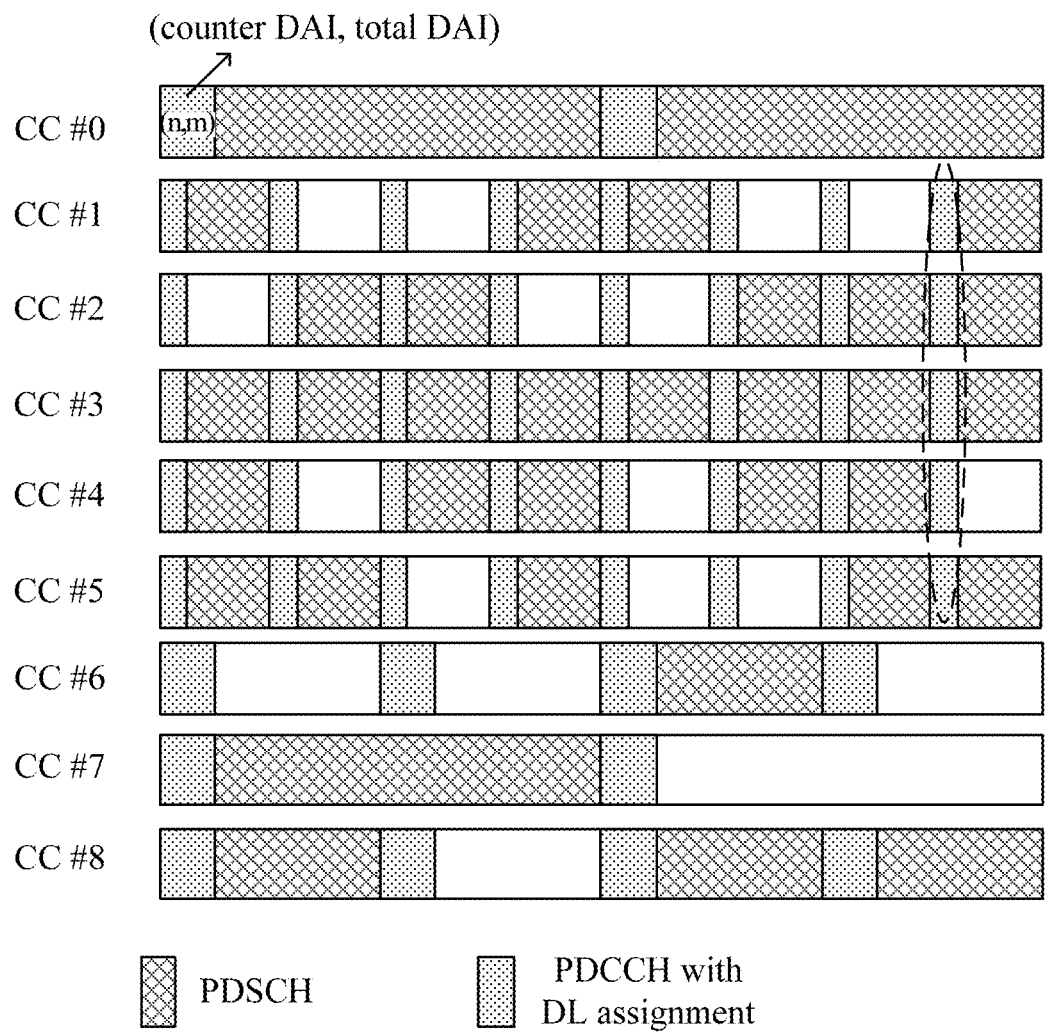
FIG. 11 is a schematic diagram of sending a required number of DAIs at the end of DCI listening occasion according to an embodiment of the present disclosure.

As shown in FIG. 11, multiple CCs are configured for the UE, and the number of CCs with the largest SCS is five, such that the UE may use the dynamic codebook to obtain the codebook size of the HARQ-ACK fed back finally through the DAI mechanism. To prevent from losing the DCI carrying the DAI at the end of the DCI listening occasion, the base station is required to send the DCI carrying the DAI at least four times at the end of the DCI listening occasion. FIG. 11 is a schematic diagram of sending the required number of the DAIs at the end of the DCI listening occasion according to an embodiment of the present disclosure.

For such operation, it is required that a sufficient number of large SCSs (such as 5 or more) in the multiple CCs configured for the UE. For example, in FIG. 10, it is required that carriers CC #1 to CC #5 are the end of the DCI listening occasion for the UE, and the number of carriers is 5.

In order to reduce the limitation of the number of carriers with the same SCS, manners are provided below.

Figure 12:
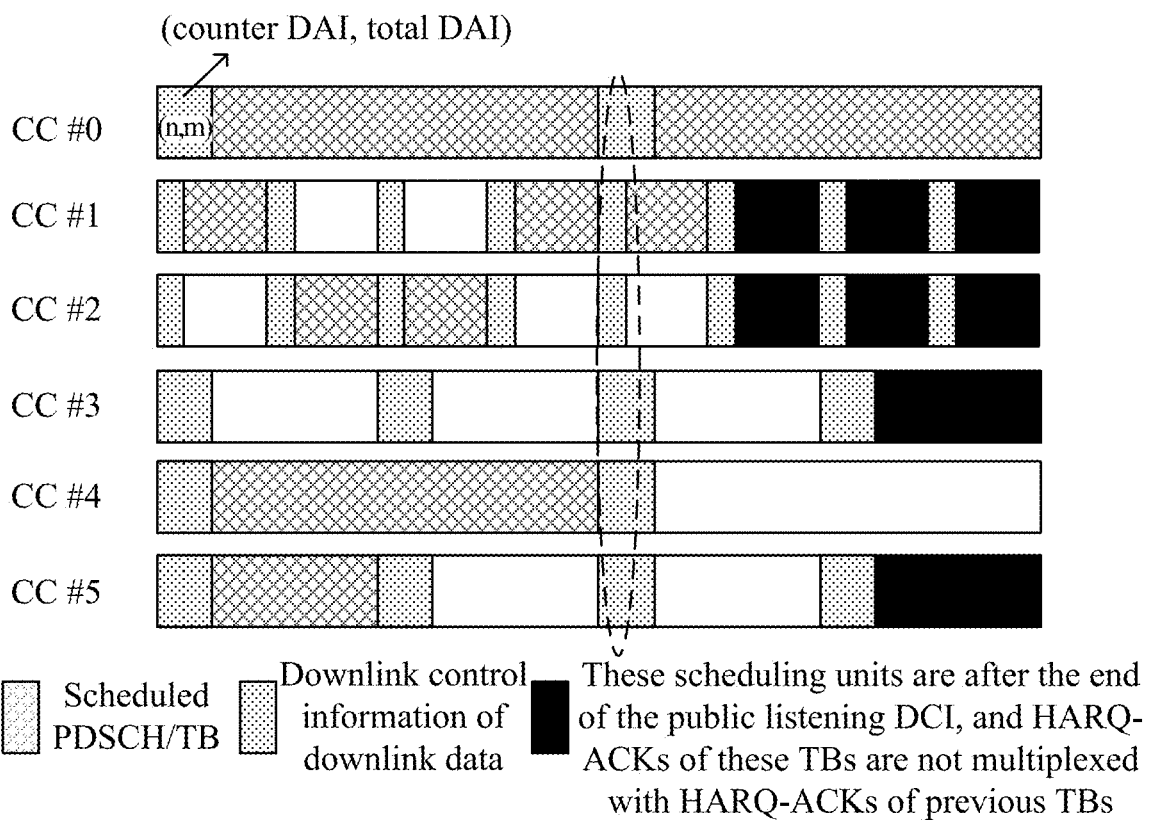
FIG. 12 is a schematic diagram 1 of a configuration of a public DCI listening occasion according to an embodiment of the present disclosure.

(1) Referring to FIG. 12, FIG. 12 is a schematic diagram 1 of a configuration of a public DCI listening occasion according to an embodiment of the present disclosure. In the multiple carriers (these carriers have different SCS or different scheduling-unit time durations) configured for the UE, multiple PDSCHs or TBs are transmitted for the UE through the multiple carriers, and the HARQ-ACKs of the multiple PDSCHs or TBs are required to be multiplexed together (forming a codebook). In this example, a public DCI listening occasion is configured for part or all of the multiple carriers. For example, FIG. 12 shows that one public DCI listening occasion is configured for all CCs. The public DCI listening occasion is configured according to a DCI position of the scheduling unit (which is equivalent to the second specified scheduling unit in the above embodiment) in the carrier (which is also called as the reference carrier and is equivalent to the second reference carrier) with the minimum SCS (or it may be considered as an occasion at which the multiple carriers simultaneously listen the DCI, and each carrier may transmit the DCI at this occasion).

Considering the reliability requirements of DAI, especially the reliability of receiving the DCI at the end of multiple TBs in which the HARQ-ACKs are multiplexed (because as long as the DAI in the DCI at the end is received, the DAI mechanism may be guarantee to work), thereby, for the multiple TBs (the HARQ-ACKs of these TBs are required to be multiplexed together) scheduled in the above multiple CCs, the end of scheduling is configured to stop at the public DCI listening occasion. At this occasion, the UE may listen the DCI of all CCs, so that as long as the DCI carrying the DAI is sent at this occasion, and as long as the number of carriers sending the DAI is greater than or equal to 5 (this number may be modified as required, and the number of other positions is similar and may be modified as required), the UE may receive the DAI at least once (according to the assumption that in four times of receiving the DC, the DCI may be received correctly at least once). In this way, it is only required that the total number of carriers configured for the UE is greater than or equal to 5, so that the number of carriers with the same SCS is no longer required to meet the requirement, but the total number of carriers needs to meet the requirement.

This manner may be summarized as: among the carriers configured for the UE, the carriers have different SCSs, the public DCI listening occasion is configured, and at least at the end of the multiple TBs scheduled this time, the public DCI listening occasion is configured to reliably obtain the DAI information (the DCI carries the DAD. The HARQ-ACK of the TB scheduled in the scheduling unit after the end of the public DCI listening occasion is not multiplexed together with the above-mentioned HARQ-ACKs of the multiple TBs.

Figure 13:
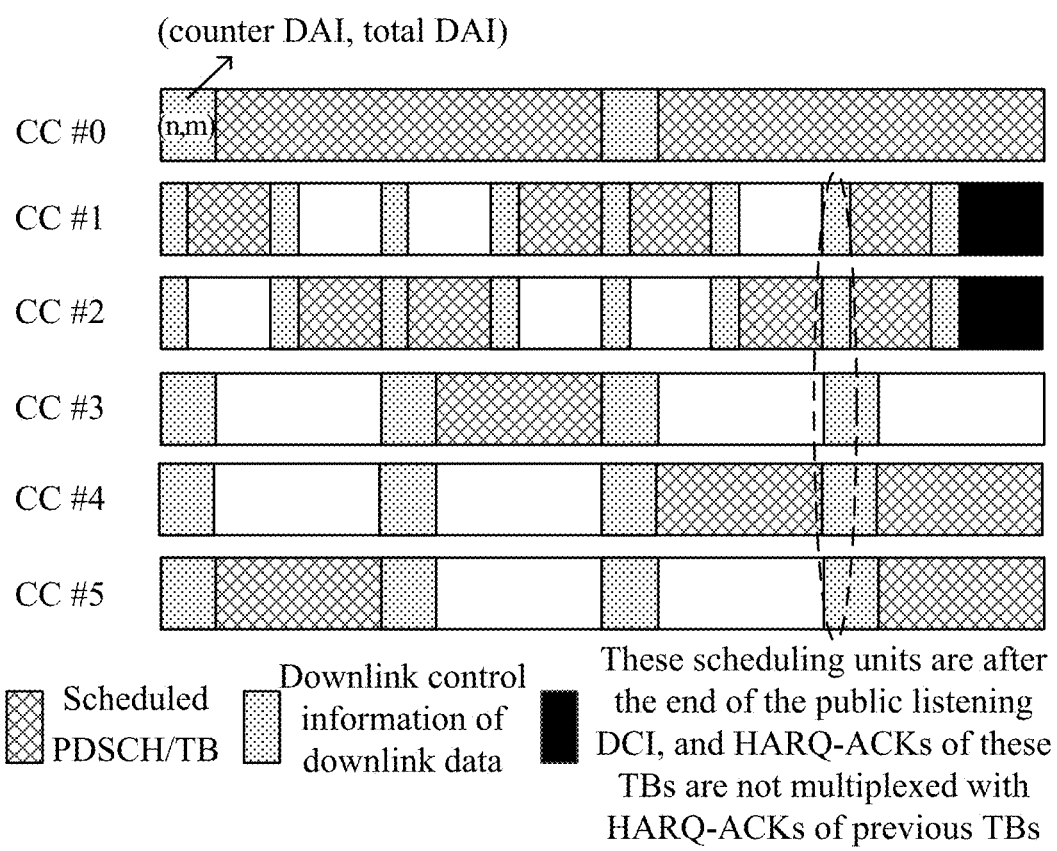
FIG. 13 is a schematic diagram 2 of a configuration of a public DCI listening occasion according to an embodiment of the present disclosure.

(2) Referring to FIG. 13, FIG. 13 is a schematic diagram 2 of a configuration of a public DCI listening occasion according to an embodiment of the present disclosure. In some cases, the number of carriers configured for the UE is large, for example, a dozen carriers. If different SCSs or different scheduling-unit time durations are provided, it becomes difficult to configure the public DCI listening occasions for all carriers as the number of carriers with different SCSs increases. In this case, since the number of carriers with different SCSs is relatively large, part of carriers may be selected to configure the public DCI listening occasion as the DCI listening occasion at the end of the multiple TBs scheduled this time, where these DCI carries the DAI. For example, in FIG. 12, six carriers are configured for the UE, and the public DCI listening occasion is configured as shown in FIG. 12. The public DCI listening occasion is part of the carriers, and is not configured according to the DCI position of the scheduling unit in the carrier with the minimum SCS. In this case, it may be considered that the public DCI listening occasion is configured according to the scheduling unit in the reference carrier (the reference carrier in this case is CC #3 or CC #4 or CC #5), and the reference carrier may be configured by the base station for the UE.

(3) When the public DCI listening occasion is configured, how to select which carriers as the carrier for the public DCI listening occasion? A manner is provided below.

A number threshold for carriers is defined, and the number threshold is assumed to be N. It is assumed that three types of SCSs used in multiple carriers configured for the UE are provided, which are 15 KHz, 30 KHz and 60 KHz respectively.

One manner is that, among the multiple carriers, the number of carriers with an SCS of 60 KHz is greater than or equal to N; the manner in FIG. 11 in this example is adopted, and the public DCI listening occasion is configured to be between the carriers with the SCS of 60 KHz. This is because the number of carriers with the SCS of 60 KHz satisfies N.

Another manner is that, among the multiple carriers, the number of carriers with the SCS of 60 KHz is less than or equal to N, and at the same time, the sum of the number of carriers with the SCS of 60 KHz and the number of carriers with an SCS of 30 KHz is greater than or equal to N, the carriers with the SCS of 30 KHz are used as the reference carriers, and the scheduling units of the carriers with the SCS of 30 KHz are used for configuring the public DCI listening occasions, that is, the public DCI listening occasions are configured between the carriers with the SCS of 30 KHz and the carriers with the SCS of 60 KHz.

Another manner is that, among the multiple carriers, the sum of the number of carriers with the SCS of 60 KHz and the number of carriers with the SCS of 30 KHz is less than or equal to N, and at the same time, the sum of the number of carriers with the SCS of 30 KHz and the number of carriers with an SCS of 15 KHz is greater than or equal to N, the carriers with the SCS of 15 KHz are used as the reference carriers, and the scheduling units of the carriers with the SCS of 15 KHz are used for configuring the public DCI listening occasions, that is, the public DCI listening occasions are configured among the carriers with the SCS of 15 KHz, the carriers with the SCS of 30 KHz and the carriers with the SCS of 60 KHz.

This manner is just an example for the public DCI listening occasions among part of carriers.

It should be noted that the above embodiments may be used in combination with each other, and are not limited thereto.

Apparently, those skilled in the art should understand that each of the above modules or steps of the present disclosure may be implemented by a general-purpose computing apparatus, the modules or steps may be concentrated on a single computing apparatus or distributed on a network formed by multiple computing apparatuses, and in some embodiments, the modules or steps may be implemented by program codes executable by the computing apparatus, so that the modules or steps may be stored in a storage apparatus and executed by the computing apparatus. In some cases, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any particular combination of hardware and software.

The above are only embodiments of the present disclosure and are not intended to limit the present disclosure, and for those skilled in the art, the present disclosure may have various modifications and variations. Any modifications, equivalent substitutions, improvements and the like made within the principle of the present disclosure should fall within the scope of the present disclosure.

What is claimed is:

1. An information decoding method, comprising:
   determining a codebook used by hybrid automatic repeat request acknowledgments (HARQ-ACKs) of a plurality of physical downlink shared channels (PDSCHs) or transport blocks (TBs) fed back by a terminal in at least one of following manners:
   manner one: determining based on a first reference carrier in a plurality of carriers configured for the terminal, which comprises one of: determining at least one scheduling unit group comprised in the plurality of carriers according to the first reference carrier, determining a first codebook corresponding to the at least one scheduling unit group according to the at least one scheduling unit group, determining a second codebook according to a scheduling unit in the first reference carrier and a scheduling unit in a carrier whose scheduling-unit time duration is same as a scheduling-unit time duration of the first reference carrier, and determining the first codebook and the second codebook as the codebook; or, determining at least one scheduling unit group comprised in the plurality of carriers according to the first reference carrier, and determining the codebook according to a frequency-domain priority rule and according to scheduling units and the at least one scheduling unit group in the plurality of carriers; or
   manner two: determining based on downlink assignment index (DAI) information sent to the terminal, wherein before the manner two, the method further comprises at least one of: at a scheduling occasion of a scheduling unit in which a last PDSCH or TB of a plurality of scheduled PDSCHs or TBs is located or within a scheduling unit in which the last PDSCH or TB is located, sending the DAI information to the terminal by using downlink control information (DCI) in a mini-slot; or, sending a predetermined amount of DCI carrying the DAI information to the terminal at a public DCI listening occasion set for a carrier configured for the terminal; and
   decoding the codebook.

2. The method of claim 1, wherein in a case of using the manner one to determine the codebook, a scheduling unit group in part or all of the plurality of carriers and aligned with a first specified scheduling unit in the first reference carrier uses a pre-agreed fixed codebook, wherein the scheduling unit group comprises a plurality of scheduling units in the part or all of the plurality of carriers and aligned with the first specified scheduling unit.

3. The method of claim 2, wherein an HARQ-ACK corresponding to the scheduling unit group comprises at least one of:
   a TB-level HARQ-ACK formed for each PDSCH or TB according to a number of PDSCHs or TBs transmitted in the scheduling unit group;
   a code block group (CBG)-level HARQ-ACK formed for each PDSCH or TB according to a number of PDSCHs or TBs transmitted in the scheduling unit group; or
   a TB-level HARQ-ACK or a CBG-level HARQ-ACK fed back according to a fixed codebook bundled by PDSCHs or TBs transmitted in the scheduling unit group.

4. The method of claim 2, wherein the first specified scheduling unit is a last scheduling unit in the first reference carrier within a time period from an occasion starting to schedule the plurality of PDSCHs or TBs to an occasion stopping to schedule the plurality of PDSCHs or TBs.

5. The method of claim 2, wherein the scheduling unit group comprises at least one of:
   within a time period from an occasion starting to schedule the plurality of PDSCHs or TBs to an occasion stopping to schedule the plurality of PDSCHs or TBs, a scheduling unit group corresponding to a last scheduling unit in the first reference carrier;
   within a time period from an occasion starting to schedule the plurality of PDSCHs or TBs to an occasion stopping to schedule the plurality of PDSCHs or TBs, a scheduling unit group in the part or all of the plurality of carriers and corresponding to a starting position of a last scheduling unit in the first reference carrier; or
   within a time period from an occasion starting to schedule the plurality of PDSCHs or TBs to an occasion stopping to schedule the plurality of PDSCHs or TBs, a scheduling unit group in which a PDSCH or a TB has been transmitted at a starting position of a last scheduling unit in the first reference carrier.

6. The method of claim 1, wherein a composition of the codebook comprises at least one of:
   in a case where the codebook is a dynamic codebook, and at least one scheduling unit in a scheduling unit group transmits the plurality of PDSCHs or TBs, composing a corresponding HARQ-ACK according to a pre-agreed fixed codebook corresponding to the scheduling unit group; and in a case where no scheduling unit in the scheduling unit group transmits the plurality of PDSCHs or TBs, not composing, by the scheduling unit group, the corresponding HARQ-ACK; or
   in a case where the codebook is a fixed codebook, for each scheduling unit group, composing a corresponding HARQ-ACK according to a pre-agreed fixed codebook corresponding to the each scheduling unit group.

7. The method of claim 1, wherein the first reference carrier is at least one of:
   a carrier with a minimum subcarrier spacing in the plurality of carriers;
   a carrier with a longest scheduling-unit time duration in the plurality of carriers;
   a reference carrier configured for the terminal; or
   a predetermined reference carrier.

8. The method of claim 1, wherein the DCI in the mini-slot is allowed to not schedule user data.

9. The method of claim 1, wherein the method is applied to at least one of following scenarios: configuring a single carrier for the terminal; configuring a plurality of carriers with different scheduling-unit time durations for the terminal; configuring a plurality of carriers with different subcarrier spacings for the terminal; or configuring a plurality of carriers with a same subcarrier spacing for the terminal.

10. The method of claim 1, wherein sending the DAI information to the terminal by using the DCI in the mini-slot comprises:
carrying the mini-slot through a first specified carrier at a sending occasion of DCI corresponding to the last PDSCH or TB, wherein the mini-slot carries the DCI of the DAI information, and the first specified carrier is different from a carrier carrying the last PDSCH or TB;
wherein a sum of a number of first specified carriers and a number of second specified carriers is greater than or equal to a required number, wherein in a case where the required number is a minimum number of DCI sending times required by the terminal to correctly detect the DCI once, the second specified carriers are carriers whose scheduling-unit time duration is same as a time duration of a scheduling unit in which the last PDSCH or TB is located.

11. The method of claim 1, wherein an amount of sent DCI is greater than or equal to a required amount, wherein the required amount is a minimum number of DCI sending times required by the terminal to correctly detect the DCI once.

12. A non-transitory storage medium, comprising stored programs, wherein the stored programs, when executed, perform the method of claim 1.

13. A codebook processing method, comprising:
determining a codebook used by hybrid automatic repeat request acknowledgments (HARQ-ACKs) of a plurality of physical downlink shared channels (PDSCHs) or transport blocks (TBs) fed back by a terminal in at least one of following manners:
manner one: determining based on a first reference carrier in a plurality of carriers configured by a base station for the terminal, which comprises one of: determining at least one scheduling unit group comprised in the plurality of carriers according to the first reference carrier, determining a first codebook corresponding to the at least one scheduling unit group according to the at least one scheduling unit group, determining a second codebook according to a scheduling unit in the first reference carrier and a scheduling unit in a carrier whose scheduling-unit time duration is same as a scheduling-unit time duration of the first reference carrier, and determining the first codebook and the second codebook as the codebook; or determining at least one scheduling unit group comprised in the plurality of carriers according to the first reference carrier, and determining the codebook according to a frequency-domain priority rule and according to scheduling units and the at least one scheduling unit group in the plurality of carriers; or
manner two: determining based on downlink assignment index (DAI) information received by the terminal, wherein before the manner two, the method further comprises at least one of: at a scheduling occasion of a scheduling unit in which a last PDSCH or TB of a plurality of scheduled PDSCHs or TBs is located or within a scheduling unit in which the last PDSCH or TB is located, listening downlink control information (DCI) carrying the DAI information sent by the base station by using a mini-slot or listening a predetermined amount of DCI carrying the DAI information sent by the base station at a public DCI listening occasion set for a carrier configured for the terminal; and
feeding back the codebook.

14. The method of claim 13, wherein feeding back the codebook comprises at least one of:
forming a TB-level HARQ-ACK for each PDSCH or TB according to a number of PDSCHs or TBs transmitted in the scheduling unit group;
forming a code block group (CBG)-level HARQ-ACK for each PDSCH or TB according to a number of PDSCHs or TBs transmitted in the scheduling unit group; or
forming a bundled fixed codebook according to PDSCHs or TBs transmitted in the scheduling unit group, wherein the bundled fixed codebook is used for feeding back a TB-level HARQ-ACK or a CBG-level HARQ-ACK.

15. The method of claim 13, wherein listening the DCI carrying the DAI information sent by the base station by using the mini-slot comprises:
listening the mini-slot carried through a first specified carrier at a sending occasion of DCI corresponding to the last PDSCH or TB, wherein the mini-slot carries the DCI of the DAI information, and the first specified carrier is different from a carrier carrying the last PDSCH or TB.

16. A codebook processing apparatus, comprising: a processor, and a memory, wherein the memory stores processor-executable programs for executing the codebook processing method of claim 13.

17. An information decoding apparatus, comprising: a processor and a memory, wherein
the memory stores instructions for processor-executable programs, and
the processor-executable programs, when executed by the processor, to implement a determination module and a decoding module; wherein
the determination module to determine a codebook used by hybrid automatic repeat request acknowledgments (HARQ-ACKs) of a plurality of physical downlink shared channels (PDSCHs) or transport blocks (TBs) fed back by a terminal in at least one of following manners:
manner one: determining based on a first reference carrier in a plurality of carriers for the terminal, which comprises one of: determining at least one scheduling unit group comprised in the plurality of carriers according to the first reference carrier, determining a first codebook corresponding to the at least one scheduling unit group according to the at least one scheduling unit group, determining a second codebook according to a scheduling unit in the first reference carrier and a scheduling unit in a carrier whose scheduling-unit time duration is same as a scheduling-unit time duration of the first reference carrier, and determining the first codebook and the second codebook as the codebook; or, determining at least one scheduling unit group comprised in the plurality of carriers according to the first reference carrier, and determining the codebook according to a frequency-domain priority rule and according to scheduling units and the at least one scheduling unit group in the plurality of carriers; or
manner two: determining based on downlink assignment index (DAI) information sent to the terminal, wherein before the manner two, the determination module is further to perform at least one of: at a scheduling occasion of a scheduling unit in which a last PDSCH or TB of a plurality of scheduled PDSCHs or TBs is located or within a scheduling unit in which the last PDSCH or TB is located, sending the DAI information to the terminal by using downlink control information (DCI) in a mini-slot; or, sending a predetermined amount of DCI carrying the DAI information to the terminal at a public DCI listening occasion set for a carrier configured for the terminal; and the decoding module to decode the codebook.

\* \* \* \* \*